US011836852B2

(12) United States Patent
Guan et al.

(10) Patent No.: US 11,836,852 B2
(45) Date of Patent: Dec. 5, 2023

(54) NEURAL NETWORK-BASED MILLIMETER-WAVE IMAGING SYSTEM

(71) Applicant: Board of Trustees of the University of Illinois, Urbana, IL (US)

(72) Inventors: Junfeng Guan, Champaign, IL (US); Seyedsohrab Madani, Champaign, IL (US); Suraj S. Jog, Champaign, IL (US); Haitham Al Hassanieh, Champaign, IL (US); Saurabh Gupta, Champaign, IL (US)

(73) Assignee: Board of Trustees of the University of Illinois, Urban, IL (US)

( * ) Notice: Subject to any disclaimer, the term of this patent is extended or adjusted under 35 U.S.C. 154(b) by 273 days.

(21) Appl. No.: 17/124,637

(22) Filed: Dec. 17, 2020

(65) Prior Publication Data
US 2021/0192762 A1 Jun. 24, 2021

Related U.S. Application Data

(60) Provisional application No. 62/951,388, filed on Dec. 20, 2019.

(51) Int. Cl.
*G06T 17/00* (2006.01)
*G06T 7/593* (2017.01)
(Continued)

(52) U.S. Cl.
CPC .............. *G06T 17/00* (2013.01); *G06T 7/593* (2017.01); *G06T 15/04* (2013.01); *G06T 15/06* (2013.01);
(Continued)

(58) Field of Classification Search
CPC ......... G06T 7/593; G06T 15/04; G06T 15/06; G06T 2207/10028; G06T 2207/20081;
(Continued)

(56) References Cited

U.S. PATENT DOCUMENTS

2013/0235163 A1* 9/2013 Joo .................. G03B 35/08
348/47

OTHER PUBLICATIONS

Zhang, T., Wiliem, A., Yang, S. and Lovell, B., Feb. 2018, TV-GAN: Generative adversarial network based thermal to visible face recognition. In 2018 international conference on biometrics (ICB) (pp. 174-181). IEEE.*

(Continued)

*Primary Examiner* — Zhitong Chen
(74) *Attorney, Agent, or Firm* — Lowenstein Sandler LLP

(57) ABSTRACT

A method includes receiving data including a plurality of data items, each data item of the plurality of data items including a three-dimensional (3D) radar heat map of an object and a corresponding two-dimensional (2D) image of the object captured by a stereo camera, inputting the training dataset into a machine learning model including a neural network (NN) that generates, from the 3D radar heat map, a 2D depth map for the object and outputs a probability that the 2D depth map is the corresponding 2D image of the object, and training the machine learning model based on a training dataset to generate a trained machine learning model that iteratively learns to generate an updated 2D depth map that approximates the corresponding 2D image. The training dataset includes the plurality of data items, the 2D depth map and the probability.

20 Claims, 8 Drawing Sheets

(51) Int. Cl.
| | |
|---|---|
| G06T 15/06 | (2011.01) |
| G06T 15/04 | (2011.01) |
| G06V 20/64 | (2022.01) |
| G06V 10/764 | (2022.01) |
| G06V 10/82 | (2022.01) |
| G06V 10/44 | (2022.01) |
| G06V 20/56 | (2022.01) |

(52) U.S. Cl.
CPC .......... *G06V 10/454* (2022.01); *G06V 10/764* (2022.01); *G06V 10/82* (2022.01); *G06V 20/56* (2022.01); *G06V 20/64* (2022.01); *G06V 20/647* (2022.01); *G06T 2207/10028* (2013.01); *G06T 2207/20081* (2013.01); *G06T 2207/20084* (2013.01)

(58) Field of Classification Search
CPC ............. G06T 2207/20084; G06T 7/55; G06T 2207/10012; G06T 2207/30252; G06T 17/00; G06V 20/647; G06V 10/454; G06V 10/764; G06V 10/82; G06V 20/56; G06V 20/64; G06N 3/0454; G06N 3/0472; G06N 3/084
See application file for complete search history.

(56) References Cited

OTHER PUBLICATIONS

Chen, L., He, Y., Chen, J., Li, Q. and Zou, Q., 2016. Transforming a 3-d lidar point cloud into a 2-d dense depth map through a parameter self-adaptive framework. IEEE Transactions on Intelligent Transportation Systems, 18(1), pp. 165-176.*

Fang, S. and Nirjon, S., Nov. 2018, Ai-enhanced 3d rf representation using low-cost mmwave radar. In Proceedings of the 16th ACM Conference on Embedded Networked Sensor Systems (pp. 414-415).*

J. Y. Zhu, T. Park, P. Isola, and A. A. Efros, "Unpaired Image-to-Image Translation Using Cycle-Consistent Adversarial Networks," Proceedings of the IEEE International Conference on Computer Vision, 2017, 10 pages.

T.-C. Wang, M.-Y. Liu, J.-Y. Zhu, A. Tao, J. Kautz, and B. Catanzaro, "High-resolution image synthesis and semantic manipulation with conditional gans," in Proceedings of the IEEE Conference on Computer Vision and Pattern Recognition, 2018, pp. 8798-8807, 10 pages.

D. Yoo, N. Kim, S. Park, A. S. Paek, and I. S. Kweon, "Pixel-level domain transfer," in European Conference on Computer Vision. Springer, 2016, pp. 517-532.

Y. Zhu, R. Zhang, D. Pathak, T. Darrell, A. A. Efros, O. Wang, and E. Shechtman, "Toward multimodal image-to-image translation," in Advances in Neural Information Processing Systems, Nov. 30, 2017, pp. 1-12.

H. Zhang, V. Sindagi, and V. M. Patel, "Image de-raining using a conditional generative adversarial network," arXiv preprint arXiv:1701.05957, Jan. 21, 2017, 12 pages.

D. Jin, Z. Xu, Y. Tang, A. P. Harrison, and D. J. Mollura, "CTrealistic lung nodule simulation from 3d conditional generative adversarial networks for robust lung segmentation," in International Conference on Medical Image Computing and Computer-Assisted Intervention. Springer, 2018, pp. 732-740.

P. Hoogeboom, F. Belfiori, and W. van Rossum, "2D-Music technique applied to a coherent FMCW MIMO radar," IET International Conference on Radar Systems (Radar 2012), 2012, 6 pages.

M. L. Burrows, "Two-dimensional ESPRIT with tracking for radar imaging and feature extraction," IEEE Transactions on Antennas and Propagation, 2004, 9 pages.

Y. Zhu, Y. Zhu, B. Y. Zhao, and H. Zheng, "Reusing 60GHz Radios for Mobile Radar Imaging," Proceedings of the 21st Annual International Conference on Mobile Computing and Networking—MobiCom '15, 2015, 14 pages.

Y. Zhu, Y. Zhu, Z. Zhang, B. Y. Zhao, and H. Zheng, "60GHz Mobile Imaging Radar," Proceedings of the 16th International Workshop on Mobile Computing Systems and Applications—HotMobile '15, 2015, 6 pages.

T. Wei and X. Zhang, "mTrack: High-Precision Passive Tracking Using Milimeter Wave Radios," Proceedings of the 21st Annual International Conference on Mobile Computing and Networking (ACM MobiCom '15), 2015, 13 pages.

T. Zhang, A. Wiliem, S. Yang, and B. Lovell, "TV-GAN: Generative adversarial network based thermal to visible face recognition," Proceedings—2018 International Conference on Biometrics, ICB 2018, 2018. Draft of Nov. 26, 2019 at 02:13, 8 pages.

C. Chen, Q. Chen, J. Xu, and V. Koltun, "Learning to see in the dark," in Proceedings of the IEEE Conference on Computer Vision and Pattern Recognition, 2018, pp. 3291-3300, 10 pages.

M. Mirza and S. Osindero, "Conditional generative adversarial nets," arXiv preprint arXiv:1411.1784, Nov. 6, 2014, 7 pages.

A. Radford, L. Metz, and S. Chintala, "Unsupervised representation learning with deep convolutional generative adversarial networks," arXiv preprint arXiv:1511.06434, Nov. 19, 2015, 15 pages.

K. He, X. Zhang, S. Ren, and J. Sun, "Deep residual learning for image recognition," in Proceedings of the IEEE conference on computer vision and pattern recognition, 2016, pp. 770-778.

R. Zhang, p. Isola, A. A. Efros, E. Shechtman, and O. Wang, "The unreasonable effectiveness of deep features as a perceptual metric," in Proceedings of the IEEE Conference on Computer Vision and Pattern Recognition, 2018, pp. 586-595.

E. Hyun, W. Oh, and J.-H. Lee, "Two-step moving target detection algorithm for automotive 77 ghz fmcw radar," in 2010 IEEE 72nd Vehicular Technology Conference—Fall. IEEE, 2010, pp. 1-5.

Analog Devices. Direct modulation/fast waveform generating, 13 ghz, fractional-n frequency synthesizer. https://www.analog.com/en/products/adf4159.html, 2014, 12 pages.

Pasternack. 60 ghz development system. https://www.pasternack.com/60-ghz-development-systems-category.aspx, 2014. 2 pages.

Ettus Research. Usrp n210. https://www.ettus.com/all-products/un210-kit/, 2012. 3 pages.

FUYU Technology. High precision ball screw linear motion guide. https://www.fuyumotion.com/high-precision-ball-screw-linear-motion-guide.html, [downloaded from the internet on Jan. 15, 2021], 13 pages.

Fadel Adib, Zach Kabelac, Dina Katabi, and Robert C Miller. 2014. 3D tracking via body radio reflections. Proceedings of the 11th USENIX Conference on Networked Systems Design and Implementation (NSDI'14) (2014). 14 pages.

Tero Karras, Samuli Laine, and Timo Aila. 2018. A Style-Based Generator Architecture for Generative Adversarial Networks. CoRRabs/1812.04948 (2018). arXiv:1812.04948 http://arxiv.org/abs/1812.04948, 10 pages.

Sherif Abdulatif, Karim Armanious, Fady Aziz, Urs Schneider, and Bin Yang. An adversarial super-resolution remedy for radar design trade-offs. arXiv preprint arXiv:1903.01392, Jun. 20, 2019, 5 pages.

Fadel Adib, Chen-Yu Hsu, Hongzi Mao, Dina Katabi, and Fredo Durand. Rf-capture: Capturing the human figure through a wall. ACM SIGGRAPH Asia, 2015, 13 pages.

Roger Appleby and Rupert N. Anderton. Millimeter-wave and submillimeter-wave imaging for security and surveillance. Proceedings of the IEEE, 2007, 8 pages.

Vijay Badrinarayanan, Alex Kendall, and Roberto Cipolla. Segnet: A deep convolutional encoder-decoder architecture for image segmentation. IEEE transactions on pattern analysis and machine intelligence, 39(12):2481-2495, Dec. 2017.

Kurt Beier and Hans Gemperlein. Simulation of infrared detection range at fog conditions for enhanced vision systems in civil aviation. Aerospace science and technology, 8(1):63-71, 2004, 9 pages.

Bloomberg Businessweek. Self-Driving Cars Can Handle Neither Rain nor Sleet nor Snow, Press Release, 2018, 5 pages.

Chuan Cheng Chen. Attenuation of electromagnetic radiation by haze, fog, clouds, and rain. Technical report, Rand Corp Santa Monica CA, Apr. 1975, 42 pages.

Long Chen, Yuhang He, Jianda Chen, Qingquan Li, and Qin Zou. Transforming a 3-d lidar point cloud into a 2-d dense depth map through a parameter self-adaptive frame-work. IEEE Transactions on Intelligent Transportation Systems, 18(1):165-176, Jan. 2017, 12 pages.

(56) References Cited

OTHER PUBLICATIONS

Marius Cordts, Mohamed Omran, Sebastian Ramos, Timo Rehfeld, Markus Enzweiler, Rodrigo Benenson, Uwe Franke, Stefan Roth, and Bernt Schiele. The cityscapes dataset for semantic urban scene understanding. In Proceedings of the IEEE conference on computer vision and pattern recognition, pp. 3213-3223, 2016, 11 pages.

László Csurgai-Horváth and János Bitó. Fog attenuation on v band terrestrial radio and a low-cost measurement setup. In 2010 Future Network & Mobile Summit, pp. 1-9. IEEE, 2010, 9 pages.

Andreas Danzer, Thomas Griebel, Martin Bach, and Klaus Dietmayer. 2d car detection in radar data with pointnets. arXiv preprint arXiv:1904.08414, Oct. 27-30, 2019, 6 pages.

Vittorio Degli-Esposti, Franco Fuschini, Enrico M Vitucci, Marina Barbiroli, Marco Zoli, Li Tian, Xuefeng Yin, Diego Andres Dupleich, Robert Müller, Christian Schneider, et al. Ray-tracing-based mm-wave beamforming assessment. IEEE Access, 2:1314-1325, Nov. 11, 2014, 12 pages.

Martin Dimitrievski, Peter Veelaert, and Wilfried Philips. Semantically aware multilateral filter for depth upsampling in automotive lidar point clouds. In 2017 IEEE Intelligent Vehicles Symposium (IV), pp. 1058-1063. IEEE, Jun. 11-14, 2017, 6 pages.

Li Ding and Gaurav Sharma. Fusing structure from motion and lidar for dense accurate depth map estimation. In 2017 IEEE International Conference on Acoustics, Speech and Signal Processing (ICASSP), pp. 1283-1287. IEEE, 2017, 5 pages.

Shiwei Fang and Shahriar Nirjon. AI-Enhanced 3D RF Representation Using Low-Cost mmWave Radar. In ACM Sen-Sys, 2018, 2 pages.

Sanja Fidler, Sven Dickinson, and Raquel Urtasun. 3D object detection and viewpoint estimation with a deformable 3D cuboid model. In NIPS, 2012, 9 pages.

Keegan Garcia, Mingjian Yan, and Alek Purkovic. Robust traffic and intersection monitoring using millimeter wave sensors. 2018, 13 pages.

Leon A Gatys, Alexander S Ecker, and Matthias Bethge. Image style transfer using convolutional neural networks. In Proceedings of the IEEE conference on computer vision and pattern recognition, pp. 2414-2423, 2016.

Mohammad Tayeb Ghasr, Matthew J. Horst, Matthew R. Dvorsky, and Reza Zoughi. Wideband microwave camera for real-time 3-D imaging. IEEE Transactions on Antennas and Propagation, Jan. 2017, 11 pages.

Daniel Glasner, Shai Bagon, and Michal Irani. Super-resolution from a single image. Proceedings of the IEEE International Conference on Computer Vision, 2009, 8 pages.

Yosef Golovachev, Ariel Etinger, Gad Pinhasi, and Yosef Pinhasi. Millimeter wave high resolution radar accuracy in fog conditions? theory and experimental verification. Sensors, 18(7):2148, Jul. 4, 2018, 12 pages.

Y Golovachev, A Etinger, GA Pinhasi, and Y Pinhasi. Propagation properties of sub-millimeter waves in foggy conditions. Journal of Applied Physics, 125(15):151612, Apr. 4, 2019, 8 pages.

Ian Goodfellow, Jean Pouget-Abadie, Mehdi Mirza, Bing Xu, David Warde-Farley, Sherjil Ozair, Aaron Courville, and Yoshua Bengio. Generative adversarial nets. In Advances in neural information processing systems, pp. 1-9, 2014.

Axel-Christian Guei and Moulay Akhloufi. Deep learning enhancement of infrared face images using generative adversarial networks. Applied optics, 57(18):D98-D107, Apr. 16, 2018, 10 pages.

Kaiming He, Georgia Gkioxari, Piotr Dolla'r, and Ross Girshick. Mask R-CNN. In Proceedings of the IEEE international conference on computer vision, pp. 2961-2969, 2017, 9 pages.

Yuhang He, Long Chen, and Ming Li. Sparse depth map upsampling with rgb image and anisotropic diffusion tensor. In 2015 IEEE Intelligent Vehicles Symposium (IV), pp. 205-210. IEEE, Jun. 28-Jul. 1, 2015.

Heiko Hirschmuller. Stereo processing by semiglobal matching and mutual information. IEEE Transactions on pattern analysis and machine intelligence, 30(2):328-341, Feb. 2007.

Phillip Isola, Jun Yan Zhu, Tinghui Zhou, and Alexei A. Efros. Image-to-image translation with conditional adversarial networks. Proceedings—30th IEEE Conference on Computer Vision and Pattern Recognition, CVPR 2017, 2017, 10 pages.

Justin Johnson, Alexandre Alahi, and Li Fei-Fei. Perceptual losses for real-time style transfer and super-resolution. In European conference on computer vision, pp. 694-711. Springer, Mar. 27, 2016.

Martin Laurenzis, Frank Christnacher, Emmanuel Bacher, Nicolas Metzger, Stéphane Schertzer, and Thomas Scholz. New approaches of three-dimensional range-gated imaging in scattering environments. In Electro-Optical Remote Sensing, Photonic Technologies, and Applications V, vol. 8186, p. 818603. International Society for Optics and Photonics, 2011, 11 pages.

Christian Ledig, Lucas Theis, Ferenc Huszár, Jose Caballero, Andrew Cunningham, Alejandro Acosta, Andrew Aitken, Alykhan Tejani, Johannes Totz, Zehan Wang, and Wenzhe Shi. Photo-realistic single image super-resolution using a generative adversarial network. Proceedings—30th IEEE Conference on Computer Vision and Pattern Recognition, CVPR 2017, 2017, 10 pages.

Chun-Liang Li, Manzil Zaheer, Yang Zhang, Barnaba's Póczos, and Ruslan Salakhutdinov. Point Cloud GAN. CoRR, abs/1810.05795, Oct. 13, 2018, 19 pages.

Jonathan S Lu, Patrick Cabrol, Daniel Steinbach, and Ravikumar V Pragada. Measurement and characterization of various outdoor 60 ghz diffracted and scattered paths. In MILCOM 2013-2013 IEEE Military Communications Conference, pp. 1238-1243. IEEE, 2013.

B. Mamandipoor, G. Malysa, A. Arbabian, U. Madhow, and K. Noujeim. 60 GHz synthetic aperture radar for short-range imaging: Theory and experiments. Conference Record—Asilomar Conference on Signals, Systems and Computers, 2014, 6 pages.

Yang Meng, Anyong Qing, Chuan Lin, Jiefeng Zang, Yizhe Zhao, and Cheng Zhang. Passive Millimeter Wave Imaging System Based on Helical Scanning. Scientific Reports, May 18, 2018, 12 pages.

Cristiano Premebida, Luis Garrote, Alireza Asvadi, A Pedro Ribeiro, and Urbano Nunes. High-resolution lidar-based depth mapping using bilateral filter. In 2016 IEEE 19th international conference on intelligent transportation systems (ITSC), pp. 2469-2474. IEEE, Nov. 1-4, 2016, 6 pages.

Charles R Qi, Hao Su, Kaichun Mo, and Leonidas J Guibas. Pointnet: Deep learning on point sets for 3d classification and segmentation. In Proceedings of the IEEE Conference on Computer Vision and Pattern Recognition, pp. 652-660, 2017.

Olaf Ronneberger, Philipp Fischer, and Thomas Brox. U-net: Convolutional networks for biomedical image segmentation. In International Conference on Medical image computing and computer-assisted intervention, pp. 234-241. Springer, 2015.

Guy Satat, Barmak Heshmat, Dan Raviv, and Ramesh Raskar. All Photons Imaging Through Volumetric Scattering. Scientific Reports, Sep. 29, 2016, 8 pages.

Guy Satat, Matthew Tancik, and Ramesh Raskar. Towards photography through realistic fog. In 2018 IEEE International Conference on Computational Photography (ICCP), pp. 1-10. IEEE, 2018.

T Savelyev, Zhuge Xiaodong, B Yang, A Yarovoy, L Ligthart, M Drozdov, and B Levitas. Development of UWB microwave array radar for concealed weapon detection. Radar Symposium (IRS), 2010 11th International, 2010, 4 pages.

Shahriar Shahramian, Michael J. Holyoak, Amit Singh, and Yves Baeyens. A fully integrated 384-element, 16-tile, w-band phased array with self-alignment and self-test. IEEE Journal of Solid-State Circuits, Sep. 2019, 16 pages.

David M. Sheen, Douglas L. McMakin, and Thomas E. Hall. Near field imaging at microwave and millimeter wave frequencies. IEEE MTT-S International Microwave Symposium Digest, 2007, 4 pages.

Karen Simonyan and Andrew Zisserman. Very deep convolutional networks for large-scale image recognition. arXiv preprint arXiv:1409.1556, Apr. 10, 2015, 14 pages.

Edward Smith and David Meger. Improved adversarial systems for 3D object generation and reconstruction. arXiv preprint arXiv:1707.09557, Oct. 30, 2017, 10 pages.

Justin Johnson, Alexandre Alahi, and Li Fei-Fei. Chainer implementation of "Perceptual Losses for Real-Time Style Transfer and Super-Resolution". Arxiv, Mar. 27, 2016, 18 pages.

(56) References Cited

OTHER PUBLICATIONS

Wouter Van Gansbeke, Davy Neven, Bert De Brabandere, and Luc Van Gool. Sparse and noisy lidar completion with rgb guidance and uncertainty. arXiv preprint arXiv:1902.05356, Feb. 14, 2019, 7 pages.

Velodyne. Velodyne Lidar Ultra Puck Datasheet. pp. 2-3.

Mingmin Zhao, Tianhong Li, Mohammad Abu Alsheikh, Yonglong Tian, Hang Zhao, Antonio Torralba, and Dina Katabi. Through-wall human pose estimation using radio signals. Cvpr, 2018, 10 pages.

Mingmin Zhao, Yingcheng Liu, Aniruddh Raghu, Tianhong Li, Hang Zhao, Antonio Torralba, and Dina Katabi. Through-wall human mesh recovery using radio signals. In Proceedings of the IEEE International Conference on Computer Vision, pp. 10113-10122, 2019.

Mingmin Zhao, Yonglong Tian, Hang Zhao, Mohammad Abu Alsheikh, Tianhong Li, Rumen Hristov, Zachary Kabelac, Dina Katabi, and Antonio Torralba. RF-based 3D skeletons. Proceedings of the 2018 Conference of the ACM Special Interest Group on Data Communication—SIG-COMM '18, 2018, 15 pages.

Samet Zihir, Ozan Dogan Gurbuz, Arjun Kar-Roy, Sanjay Raman, and Gabriel M Rebeiz. 60-ghz 64-and 256-elements wafer-scale phased-array transmitters using full-reticle and subreticle stitching techniques. IEEE Transactions on Microwave Theory and Techniques, 64(12):4701-4719, Dec. 2016.

A. Radford, L. Metz, and S. Chintala, "Unsupervised representation learning with deep convolutional generative adversarial networks," arXiv preprint arXiv:1511.06434, Jan. 7, 2016, 16 pages.

\* cited by examiner

NEURAL NETWORK-BASED MILLIMETER-WAVE IMAGING SYSTEM

FEDERALLY SPONSORED RESEARCH OR DEVELOPMENT

This disclosure was made with government support under Grant No. 1750725 awarded by the National Science Foundation. The government has certain rights in the invention.

TECHNICAL FIELD

Embodiments of the disclosure relate generally to computer vision, and more specifically, relate to neural network-based millimeter-wave imaging systems to enable high-resolution millimeter-wave imaging.

BACKGROUND

Light detection and ranging (LiDAR) or cameras can be used as sensors to obtain a view of the surrounding environment. However, since these sensors rely on optical frequencies for imaging, they suffer in low visibility conditions such as those caused by fog, snow, and dust particles. Cameras also suffer at night in low light conditions. This may be problematic in, for example, autonomous or self-driving vehicle applications, as many manufacturers of autonomous vehicles may avoid using LiDAR altogether, making cameras their primary sensory sub-system. Suffering in low visibility conditions is one obstacle in the way of achieving fully autonomous vehicles.

BRIEF DESCRIPTION OF THE DRAWINGS

A more particular description of the disclosure briefly described above will be rendered by reference to the appended drawings. Understanding that these drawings only provide information concerning typical embodiments and are not therefore to be considered limiting of its scope, the disclosure will be described and explained with additional specificity and detail through the use of the accompanying drawings.

DETAILED DESCRIPTION

Figure 1:
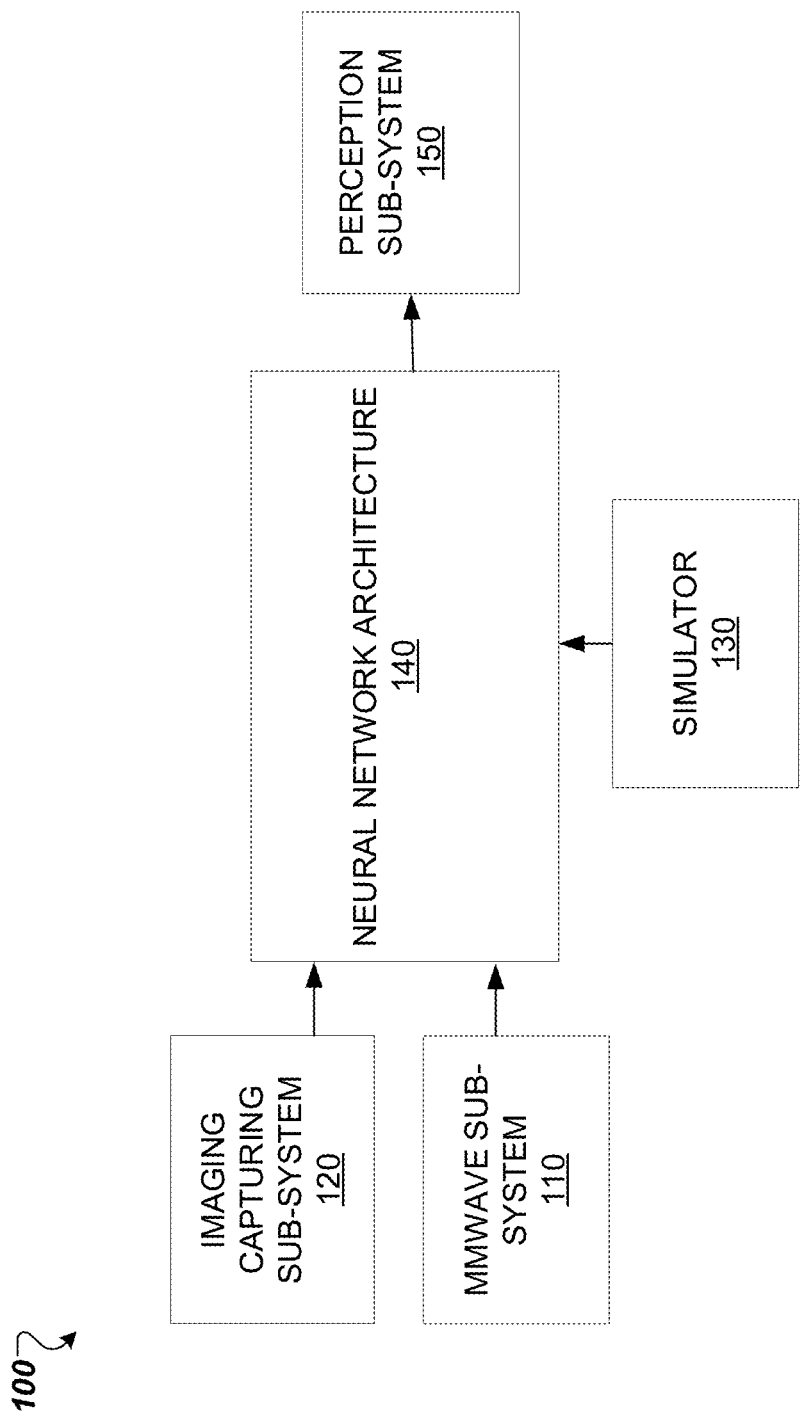
FIG. 1 is a block diagram overview of a neural network-based millimeter-wave (mmWave) imaging system according to embodiments of the present disclosure.

The following description sets forth numerous specific details such as examples of specific systems, components, methods, and so forth, in order to provide a good understanding of various embodiments of the techniques described herein for high-resolution millimeter wave (mmWave) imaging for self-driving vehicles. It will be apparent to one skilled in the art, however, that at least some embodiments may be practiced without these specific details. In other instances, well-known components, elements, or methods are not described in detail or are presented in a simple block diagram format in order to avoid unnecessarily obscuring the techniques described herein. Thus, the specific details set forth hereinafter are merely exemplary. Particular implementations may vary from these exemplary details and still be contemplated to be within the spirit and scope of the present invention.

Reference in the description to "an embodiment," "one embodiment," "an example embodiment," "some embodiments," and "various embodiments" means that a particular feature, structure, step, operation, or characteristic described in connection with the embodiment(s) is included in at least one embodiment of the invention. Further, the appearances of the phrases "an embodiment," "one embodiment," "an example embodiment," "some embodiments," and "various embodiments" in various places in the description do not necessarily all refer to the same embodiment(s).

The description includes references to the accompanying drawings, which form a part of the detailed description. The drawings show illustrations in accordance with exemplary embodiments. These embodiments, which may also be referred to herein as "examples," are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

Millimeter wave (mmWave) wireless signals can offer more favorable characteristics over LiDARs or cameras due to their ability to work at night and in inclement weather. More specifically, a mmWave radar can image through rain, fog, and other reduced visibility conditions, where optical sensors can fail. However, mmWave radars may be limited to unidirectional ranging and cannot fully image the environment. Furthermore, while mmWave technology may offer higher resolution than standard wireless technologies, the spatial resolution may not be as high as obtained from LiDARs or cameras. For example, images in rain, fog, etc. may appear as blobs of radio-frequency (RF) reflections and may carry little to no contextual and perceptual information compared to a camera image. In addition, wireless mmWave signals can demonstrate specularity and low-resolution that can result in poor perceptual quality. Specularity generally refers to the visual appearance of specular or regular reflections, which are mirror-like reflections of waves from a surface of an object such as a vehicle. As a result, not all reflections from the object may propagate back to the mmWave receiver and can result in parts of the object failing to appear in the image. This may create challenges in detecting the shape, size, and even orientation of the object from mmWave radar images. Wireless reflections from the object can also bounce off obstacles surrounding the object, such as a road and other vehicles, and travel along multiple paths to the mmWave receiver which may create shadow reflections in various locations in the scene. Hence, multipath can result in noisy artifacts in the image that may be hard to interpret or dismiss as fictitious obstacles.

Some of these challenges may be addressed by using large mechanically steerable arrays to improve the resolution. Additionally, the object being imaged may be isolated in the near field to reduce multipath reflections. Antennas may be caused to rotate around the object to address specularity. However, such a design would be extremely bulky and not practical for self-driving vehicles. Further, a self-driving vehicle would have no control over surrounding objects (e.g., other vehicles) being imaged. The advent of 5G networks in the mmWave spectrum has led to the creation of compact phased arrays with hundreds of antennas. Such technology may enable extremely narrow beams which can be steered electronically. By electronically steering the beam, reflections from different regions in space can be captured and potentially used to image the environment. Unfortunately, simply using very narrow steerable beams may not be sufficient due to a number of reasons including poor resolution, high specularity, and multipath reflections.

Aspects of the present disclosure address these and other deficiencies of mmWave radar imaging by using a neural network (NN)-based mmWave imaging system to enable high-resolution mmWave imaging. Throughout the present disclosure, the s mmWave imaging system is referred to as a mmWave imaging system for simplicity. In some embodiments, the mmWave imaging system includes a processing device configured to receive three-dimensional (3D) radar heat maps of a scene taken of an object by one or more imaging capturing devices (e.g., stereo cameras). The mmWave imaging system described herein can provide improved mmWave imaging quality by constructing (higher quality) two-dimensional (2D) depth maps from the (lower quality) 3D radar heat maps generated by the mmWave radar using a neural network architecture. A 2D depth map may be an approximation of a 2D aspect of the object. For example, the mmWave imaging system can improve imaging quality by, e.g., filling in missing gaps due to specularity, and eliminating artifacts caused by multipath reflections. This may allow the mmWave imaging system to estimate a location, shape, orientation, and size of an object in a scene and recreate accurate images in reduced visibility conditions and other poor imaging environments, as well as generalize to different environments.

In various embodiments, error in the mmWave imaging system in estimating object location, orientation, shape, size, and the like can be computed to further evaluate the mmWave imaging system. Thus, the mmWave imaging system described herein can accurately reconstruct an object's size and the 2D location, while preserving the key perceptive features such as orientation and shape. In an illustrative embodiment, the mmWave imaging system can improve the quality of mmWave imaging for self-driving vehicles by generating high-resolution, accurate, and perceptually interpretable images of vehicles, including vehicles operating in poor environmental conditions (e.g., fog and/or rain).

In various embodiments, the mmWave imaging system described herein can train a machine learning model including a generative adversarial network (GAN). Although the description herein is within the context of GANs for illustrative purposes, other neural network architectures can be used to implement the mmWave imaging system. For example, a discriminative model with an encoder-decoder network architecture using L loss can be used. The mmWave imaging system can employ other models such as, e.g., a perceptron (P), feed forward (FF) Markov Chain (MC), echo state network (ESN).

Generally, a GAN is used to indirectly learn to generate data samples that closely follow a distribution of data (i.e., without explicitly learning the distribution). The GAN architecture generally includes two neural networks, a generator network ("generator") and a discriminator network ("discriminator"). To perform the indirect learning, the GAN architecture implements an adversarial learning paradigm where a first player and a second player, the generator and the discriminator respectively, compete against each other in a zero-sum game. For example, the zero-sum game can be a minimax game (which is identical to a maximin game in the zero-sum context). In the zero-sum game, the generator as the first player attempts to generate, from a training data set, synthesized data that mimics real (i.e., non-synthesized) data samples, and the discriminator as the second player attempts to differentiate between samples generated by the generator from real data samples. The learning process occurs until the generator can generate samples that the discriminator can no longer distinguish from real samples of the true distribution. At this stage, the discriminator may no longer be needed and the generator can be used during inference to generate new samples. Accordingly, the GAN architecture can generate realistic-looking samples without having to learn complex data distributions, and they may not require a fixed hand-tuned loss function as they can adapt the loss function in the above equation as they learn. In one embodiment, the GAN architecture is a conditional GAN (cGAN) architecture, where the generator may attempt to mimic a distribution of the data conditioned on some input.

As applied to the mmWave imaging system described herein, the generator may be configured to generate a 2D depth map from a 3D radar heat map. The discriminator may be configured to discriminate the 2D depth map from ground truth data extracted from imaging of the object. The generator, in order to generate the 2D depth map, may be configured to minimize a loss function and the discriminator, in order to discriminate the 2D depth map, may be configured to maximize the loss function. The loss function may include two terms: a first term that is maximized when the discriminator discriminates the real 2D data sample, and a second term that is maximized when the discriminator discriminates the 2D depth map.

FIG. 1 is a block diagram overview of a mmWave imaging system ("system") 100 according to embodiments of the present disclosure. For example, the system 100 can be an mmWave imaging system designed for autonomous or self-driving vehicles. However, such an embodiment should not be considered limiting. One goal of the system 100 is to generate a realistic looking object (e.g., car) by generating high-resolution perceptually interpretable 2D depth maps from 3D mmWave heat maps, in addition to reconstructing the accurate shape, size, orientation, and location of the object from the mmWave heat map.

As shown, the system 100 can include a mmWave imaging sub-system 110, an image capturing sub-system 120, a simulator 130, a neural network architecture 140, and a perception sub-system 150. The imaging capturing sub-system 120 and the simulator 130 may be used during training and evaluation. The mmWave imaging sub-system 110, neural network architecture 140, and perception sub-system 150 may be used during the training and inference (i.e., testing) stages.

In some embodiments, the mmWave imaging sub-system 110 may be implemented using a frequency-modulated continuous-wave (FMCW) waveform at 60 GHz radio and Synthetic Aperture Radar (SAR) can be used to emulate a large antenna array for capturing 3D mmWave heat maps. The mmWave imaging sub-system 110 may also use a linear slider platform to emulate a large antenna array leveraging synthetic aperture radar, which may provide more flexibility to test and experiment various parameters and setups. The mmWave imaging sub-system 110 can thus produce 3D heat maps that can serve as input data for the neural network architecture 140. Every voxel of the 3D value of a 3D heat map thus maps to RF signal strength. Further details regarding the mmWave imaging sub-system 110 will be described below with reference to FIG. 4.

The image capturing sub-system 120 is configured to generate real image data corresponding to ground-truth. More specifically, the image capturing sub-system 120 can generate high-resolution 2D depth maps of objects (e.g., vehicles) that may serve as ground truth for the system 100. The image capturing sub-system 120 can include any suitable imaging device(s) in accordance with the embodiments described herein.

In some embodiments, LiDAR could be used within the image capturing sub-system 120. However, LiDAR systems can be expensive. In some embodiments, the image capturing sub-system 120 can include one or more cameras (e.g., long-range cameras). More specifically, the image capturing sub-system 120 can be a stereo camera system. In this embodiment, a camera can be placed on a linear slider to capture multiple images of the scene, and stereo image processing can then be applied to extract the 2D depth maps. Pixels that do not belong to objects of interest can be filtered out using labeled object masks. The object masks can be created by applying a pre-trained object detection model on raw camera images.

The amount of data required to train the system 100 may be on the order of thousands of input and ground truth images. Collecting such an amount of data could be time consuming. To address this, the simulator 130 can be provided to synthesize paired up 3D mmWave heat maps and 2D depth maps from 3D models of various types of objects configured. The simulator 130 can be designed to create 3D point reflector models of vehicles and then simulate reflected mmWave signals using ray tracing. More specifically, the simulator 130 can generate both a ground truth 2D depth map and synthesized 3D mmWave heat maps. The simulator 130 can use precise ray tracing models to generate and capture the propagation and reflection characteristics of mmWave RF signals as well as specularity and artifacts resulting from multipath reflections. That is, the simulator can augment a training dataset with synthesized data obtained from 3D models of objects (e.g., vehicles) and mmWave ray tracing algorithms.

The neural network architecture 140 can be customized for improving mmWave imaging quality by transforming, using a trained machine learning model, low-resolution 3D heat maps into high-resolution 2D depth maps with pixels corresponding to depth, in contrast to standard vision-based learning for image-to-image translation. For example, the neural network architecture 140 may use an encoder-decoder paradigm, a modified loss function, and skip connection to produce perceptually interpretable and accurate reconstructions of objects (e.g., vehicles). In some embodiments, the mmWave imaging sub-system 110 and the image capturing sub-system 120, even when placed at the same location, may not yield the same view point and field of view. Hence, the discrepancy should be calibrated to be able to accurately train and test the neural network architecture 140.

Figure 2:
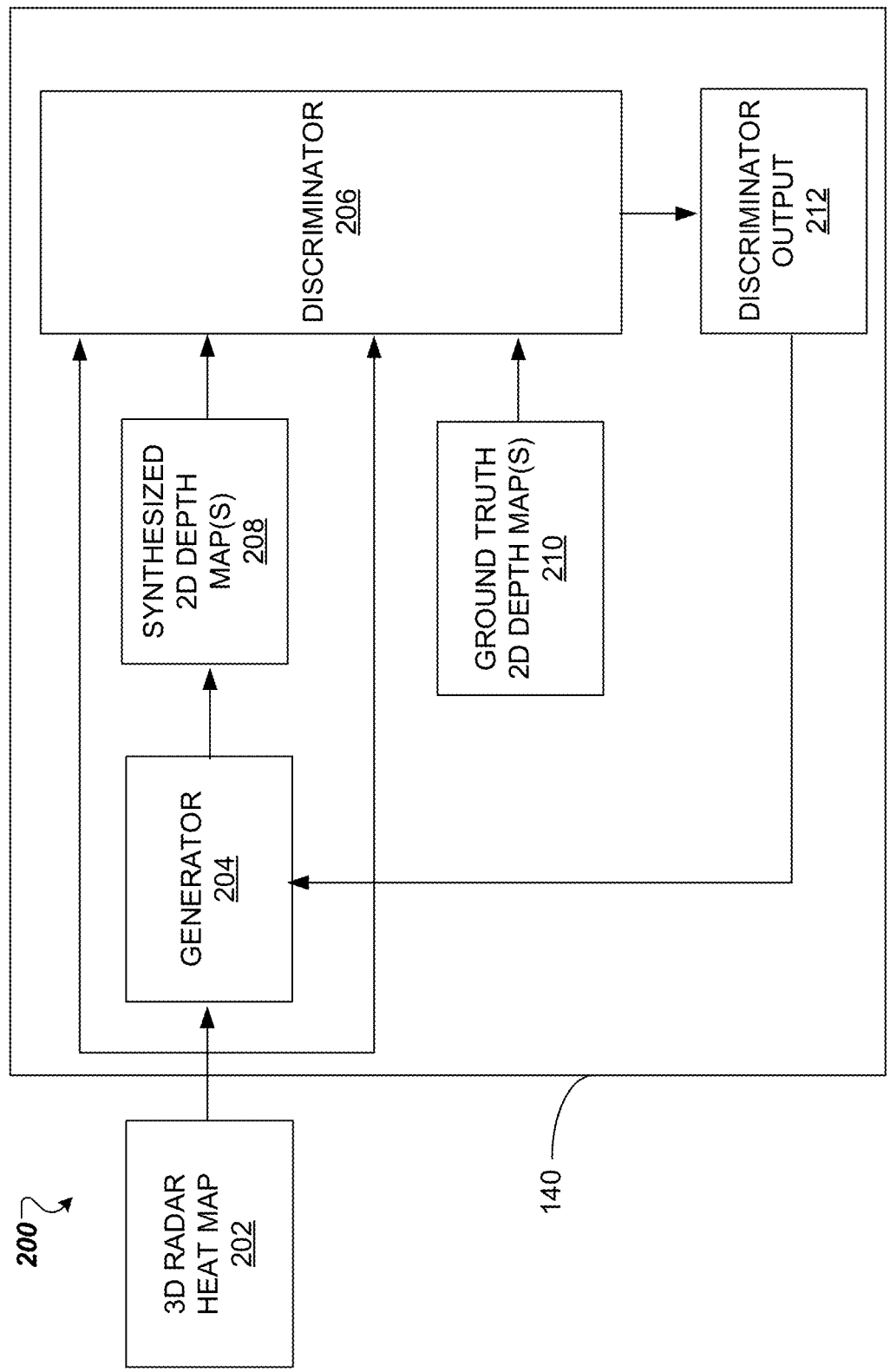
FIG. 2 is a schematic diagram of a generative adversarial network (GAN) that can be implemented within the mmWave imaging system of FIG. 1, according to embodiments of the present disclosure.

In one embodiment, and as will be described in further detail below with reference to FIGS. 2, 3A and 3B, the neural network architecture 140 can implement a machine learning model including a GAN. For example, the GAN can be a cGAN, which may further enhance the resolution and quality of mmWave imaging. Further details regarding the GAN implementation will be described below with reference to FIGS. 2, 3A, and 3B. In some embodiments, other neural network architectures to implement the machine learning model can be employed (e.g., a perceptron (P), feed forward (FF) Markov Chain (MC), echo state network (ESN), or the like). Accordingly, the neural network architecture 140 can train any suitable machine model in accordance with the embodiments described herein.

In order to ensure quantitative accuracy, the loss function used by the neural network architecture 140 can be modified. For example, instead of using the standard GAN loss in the case of a GAN architecture, the modified loss function may include an L loss term and a perceptual loss term such that the output is quantitatively and perceptually close to the ground-truth. Note that L loss represents an absolute value of a difference between pixels in the input and the ground-truth.

In addition to modifying the loss function, skip-connections can be adapted for use within the neural network architecture 140 to directly transfer features from input 3D heat map to the output 2D depth map. For example, mmWaves may provide accurate ranging data which should be mapped directly to the output. Specifically, skip-connections may allow the neural network architecture 140 to directly map features between the input and the output while the features may be difficult for the neural network architecture 140 to learn. Without such skip-connections, the neural network architecture 140 may degrade the accuracy of the object's location.

The neural network architecture 140 can be trained in two stages. Illustratively, in the first stage, it can be trained for 170 epochs using a synthesized dataset of 3000 images with batch size 4. In the second stage, the model can be fine-tuned for 60 additional epochs with 100 real mmWave images captured in clear environmental conditions. It is important to note that the machine learning model is not trained on examples collected in poor environmental conditions, such as, e.g., fog or rain. The mmWave imaging system performance can be tested on 1000 synthesized images, as well as the remaining 227 real images including the 101 fog and rain experiments. For testing, standard k-fold cross-validation with k=5 is followed to test all 327 scenes while ensuring examples in the test dataset are not used during training. In one embodiment, the runtime for the 3D heat map to 2D depth map translation can be 23 ms per image.

The results of the system 100 can be compared against the ground truth obtained from the image capturing sub-system 120 as well as images generated by the mmWave imaging sub-system 110. The perception sub-system 150 can include a processing device for extracting quantitative metrics from the ground-truth, input, and output, such as size, shape, location, orientation and boundary of the vehicle. The perception sub-system 150 can compare the output of the neural network architecture 140 with the ground truth and the input 3D heat maps.

In some embodiments, the simulator 130 can generate synthesized 2D images of potential objects from a combination of 2D computer-aided design (CAD) models and corresponding scene images, model radar cross-sections of the potential objects by modeling surfaces as a cluster of point reflectors and performing ray tracing on scattering corners and specular surfaces, simulate, using the modeled radar cross-sections, received mmWave signals of the potential objects using a point reflector model with background noise added in to generate synthesized 3D radar heat maps, and import, into the machine learning model, displacement data between each synthesized 2D image and each corresponding synthesized 3D radar heat map. In these embodiments, the training dataset can further include the synthesized 2D images, the synthesized 3D radar heat maps, and the displacement data FIG. 2 is a schematic diagram of a GAN architecture 200 according to embodiments of the present disclosure. The GAN architecture 200 can be implemented as a neural network architecture within an mmWave imaging system to improve image quality, such as the system 100 of FIG. 1. In some embodiments, the GAN architecture 200 is implemented within an mmWave imaging system corresponding to an autonomous vehicle. However, such embodiments should not be considered limiting. In one embodiment, the GAN architecture 200 can be a cGAN architecture.

In one embodiment, the GAN architecture 200 is the neural network architecture 140 of FIG. 1. The neural network architecture 140 can receive a three-dimensional (3D) radar heat map 202, as described above with reference to FIG. 1. More specifically, the 3D radar heat map 202 can correspond to an object captured by a mmWave imaging system. For example, the object can be a vehicle. However, the object can be any suitable object in accordance with the embodiments described herein.

More specifically, the GAN architecture 200 includes a generator network ("generator") 204 and a discriminator network ("discriminator") 206. The generator 204 is configured to receive the 3D radar heat map 202 and generate at least one synthesized 2D depth map 208 based on the 3D radar heat map 202. The discriminator 206 attempts to differentiate between the synthesized 2D depth map 208 from at least one ground truth 2D depth map 210 to generate a discriminator output 212. For example, the ground truth 2D depth map 210 can be a high-resolution 2D depth map generated based on the imaging of the actual object, such as a by a stereo camera. The generator 204 never actually sees the ground truth 2D depth map 210. Instead, as will be described in further detail herein, the generator 204 learns to create realistic images based on feedback it receives from the discriminator 206.

The discriminator output 212 indicates whether or not the discriminator 206 has identified the synthesized 2D depth map 208 as being indistinguishable from real data. Thus, the discriminator output 212 can be provided as feedback to the generator 204 in order to improve the synthesized 2D depth map generation. The generator 204 will keep generating synthesized 2D depth map 208 through iterative training until the discriminator 206 can no longer distinguish the synthesized 2D depth map 208 from real data (e.g., the ground truth 2D depth map 210). At this stage, the discriminator 206 may no longer be needed and the generator 204 can be used during the inference or testing stage.

For example, the discriminator 206 may generate a discriminator output 212 including D(x, y) and D(x, G(x)). D(x, y) is a mapping that takes as input training data x and real image y and assigns a probability that an input real image y is real. D(x, G(x)) is a mapping that takes as input the training data x and the synthesized data generated by the generator 204, G(x), and assigns a probability that G(x) is real. Thus, a perfect discriminator in this example would generate a discriminator output 212 including D(x, y)=1 and D(x, G(x))=0, in which the discriminator 206 has correctly classified the real data as real and the synthesized data as fake. Hence, to "win the game" against the generator 204, the discriminator 206 can act to maximize the following objective or loss function:

$$£(G)=\max_D(E_y[\log D(x,y)]+E_x[\log(1-D(x,G(x)))])$$

where the first term is maximized when D(x, y)=1 and the second term is maximized when D(x, G(x))=0. The generator 204 on the other hand, can act to minimize the above objective function, since its goal is to fool the discriminator 206 into classifying its output data samples as being real. Therefore, the GAN optimization can be viewed as a minimax problem given by:

$$\min_G(\max_D(E_y[\log D(x,y)]+E_x[\log(1-D(x,G(x)))])$$

Alternatively, the assigned probability can be associated with whether y or G(x) is fake, such that a perfect discriminator in this example would generate a discriminator output 212 including D(x, y)=0 and D(x, G(x))=1. The above equations can thus be modified based on this embodiment by swapping the positions of D(x, G(x)) and D(x,y).

Since the mapping functions in the generator 204 and the discriminator 206 can be very complex, the generator 204 and the discriminator 206 can be implemented and optimized using deep convolutional neural networks. The final output of the above GAN optimization is a G* that can minimize the loss function £(G) and can be used to generate 2D depth maps from new unseen 3D mmWave heat maps. Accordingly, the neural network architecture 140 may never explicitly learn the distribution of the data, and may adaptively learn its own loss function.

In one embodiment, the neural network architecture 140 transforms 2D depth maps to 3D point clouds where each voxel value maps to a binary one or zero, and uses a point cloud GAN to generate 3D point clouds from 3D heat maps. However, such a design may result in sparse high-dimensional output data. The neural network architecture 140 may need to learn a number of parameters which may increase the optimization search space and may make it difficult for the network to converge.

The GAN architecture 200 described above can eliminate dependency on the environment, as the GAN architecture 200 enables the generator 204 to generate realistic synthesized images of objects by indirectly learning features that are independent of the background and location of the object in the training scenes. Additionally, since issues like artifacts caused by multipath, specularity, etc. will not "fool" the discriminator 206 into thinking that the synthesized 2D depth map 208 is the ground truth 2D depth map 210, the discriminator 206 can train the generator 202 to remedy these issues by, e.g., filling in the missing parts of the object due to specularity and eliminating artifacts caused by multipath. After training with synthesized data, the GAN architecture 200 may be fine-tuned using real data in clear conditions that can be captured in order to create a more robust and reliable architecture. Such additional real data is not included in training data used to train the GAN architecture 200, and a k-fold cross-validation may be used to test the training of the GAN architecture 200.

In some cases, the design of the GAN architecture 200 can result in sparse high-dimensional input and output data. Training such 3D GAN is known to be notoriously hard. As the sizes of the input and output increase, the number of parameters in the GAN architecture 200 (e.g., specifically, the generator 204 and the discriminator 206) may increase significantly. Consequently, the learning process that trains the GAN architecture 200 may have to search through an exponentially larger space. Hence, it may be more difficult for the network to converge and heuristics like gradient descent may become more prone to getting stuck in local minima. For example, an input 3D heat map x may have a size of 64×32×96. Increasing the resolution of the heat map by four times (4×) could output a 3D point cloud of size 256×128×384. Training the generator 202 with this input and output size could require approximately 10 billion parameters.

Instead, to resolve these deficiencies in some approaches of dealing with sparse high-dimensional input and output data, as will be described with reference to FIGS. 3A and 3B, the input 3D heat map and the output 2D depth map can be encoded into a common one-dimensional (1D) space through separate neural networks which may reduce the complexity of the network while also allowing for the direct comparison of encoded input and output. This design has a variety of benefits. For example, this common encoding approach can significantly reduce the complexity of the GAN architecture 200. As another example, the common encoding approach can allow for the encoded input and output to be compared directly. Since the resulting neural networks require approximately 260 million parameters, these neural networks can therefore be run on a standard graphics processing unit (GPU).

Further details regarding the generator 204 and the discriminator 206 will now be described below with reference to FIGS. 3A and 3B. As described above, the GAN architecture 200 may learn to generate a high-resolution 2D depth map from a 3D radar heat map. In various embodiments, the ground truth 2D depth map and output of the mmWave imaging system 100 are 2D images with each pixel representing depth, whereas its input is a 3D radar heat map where each voxel maps to RF signal strength. In order to address the discrepancy in dimensions, the GAN architecture 200 can transform the 2D depth maps to 3D point clouds where each voxel value maps to a binary one or zero and can use a point cloud GAN to generate 3D point clouds from 3D heat maps.

Figure 3A:
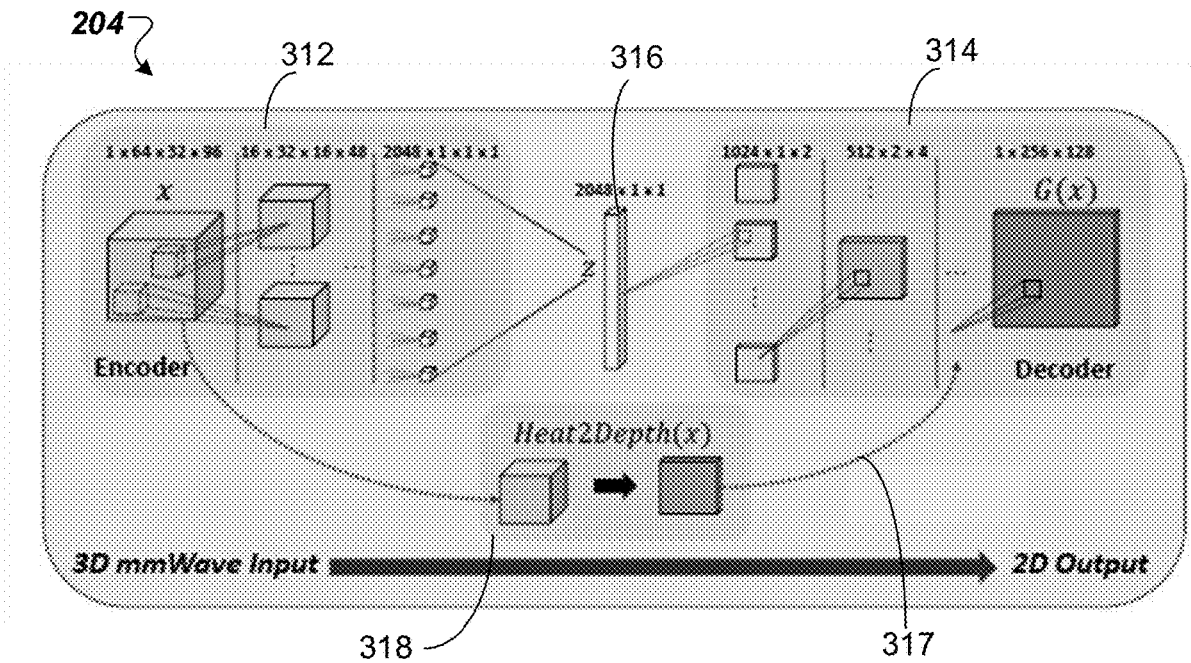
FIG. 3A is a block diagram of a generator network that can be implemented the GAN architecture of FIG. 2, according to embodiments of the present disclosure.

FIG. 3A shows an example of a network architecture of the generator 204 of the GAN architecture 200 that can be implemented within a mmWave imaging system according to embodiments of the present disclosure. The generator 204 implements a deep neural network. More specifically, the generator 204 can implement an encoder-decoder architecture including an encoder network ("encoder") 312 and a decoder network ("decoder") 314. As shown, the encoder 312 receives an input x having a size of 1×64×32×96. The input x may represent a 3D radar heat map in, e.g., spherical coordinates (azimuth angle, elevation angle, range) and may be generated by a mmWave sub-system, where voxel values represent signal strength.

Instead of directly generating an output from the input x using consecutive layers, the encoder 312 can be used to encode the input x into an encoded input, z, 316. More specifically, the encoder 312 can encode voxels within the 3D radar heat map. The encoded input 316 can be a lower-dimensional representation to account for dimension mismatch. For example, as shown, the encoded input 316 can be squeezed into an n×1×1 vector (e.g., in this example n=2048) to account for dimension mismatch (i.e., a one-dimensional (1D) vector. More specifically, as shown, the encoder 312 may start with one channel of 3D input. At each layer, there may be 3D convolutions, each of which is followed by activation functions (e.g., leaky-ReLU) and batch-norm layers. Within each layer, the number of channels increases and the size of the 3D kernel decreases until the encoded input 316 is obtained. The encoded input 316 can represent a common feature space between input and output.

The encoded input 316 is then passed to the decoder 314 where it may then go through a reverse process using 2D transposed convolutions to generate an output G(x). The output G(x) may represent a high-resolution 2D depth map where pixel values represent depth. More specifically, each layer in the decoder 314 increases the size of the 2D kernel and decreases the number of channels until the output G(x). In one embodiment, the generator 204 uses 5 convolutional layers in the encoder 312 and 7 transposed convolutional layers in the decoder 314.

The generator 204 may also implement skip connections including skip connection 317 between the encoder 312 and the decoder 314 that may allow for information in an early layer to fast-forward directly to output layers. As going through consecutive layers tends to saturate the accuracy of the approximation, a skip connection may be added from, e.g., the input of the encoder 312 to the third-to-last layer of the decoder 314.

More specifically, skip connections may be implemented by concatenating output feature map of one layer to the input feature map of another layer of the same dimensions. However, none of the layers of the encoder 312 and decoder 314 have same dimension due to the dimension mismatch between the 3D input and 2D output. To address this, the generator 310 further includes a heat map-to-depth map transformation component 318 that transforms an input 3D heat map into an output 2D depth map. Specifically, for each 2D spatial location in the input 3D heat map, the component 318 can assign the depth as the location of the largest value (corresponding to highest signal strength) along the depth dimension. More formally, $$x_{2D}(\phi,\theta) = \arg\max_r x_{3D}(\phi,\theta,r)$$

where $\phi$ is the azimuth angle, $\theta$ is the elevation angle, and r is the range. The component 318 integrates radio frequency (RF) range information, which can be received with the 3D radar heat map within a layer of the transposed convolutions (e.g., within a last three layers).

However, simply choosing the depth corresponding to the largest value may be unstable and can lead to errors. Instead, the m largest values and be chosen to create m channels of 2D depth maps which can then be concatenated to a feature map of the same dimension in the decoder 314. The value of m can be chosen as any integer, such as from 2 to more than 10 or 20. In one embodiment, m is chose as 8. In some embodiments, the above transformation only makes sense when applied to the input.

Figure 3B:
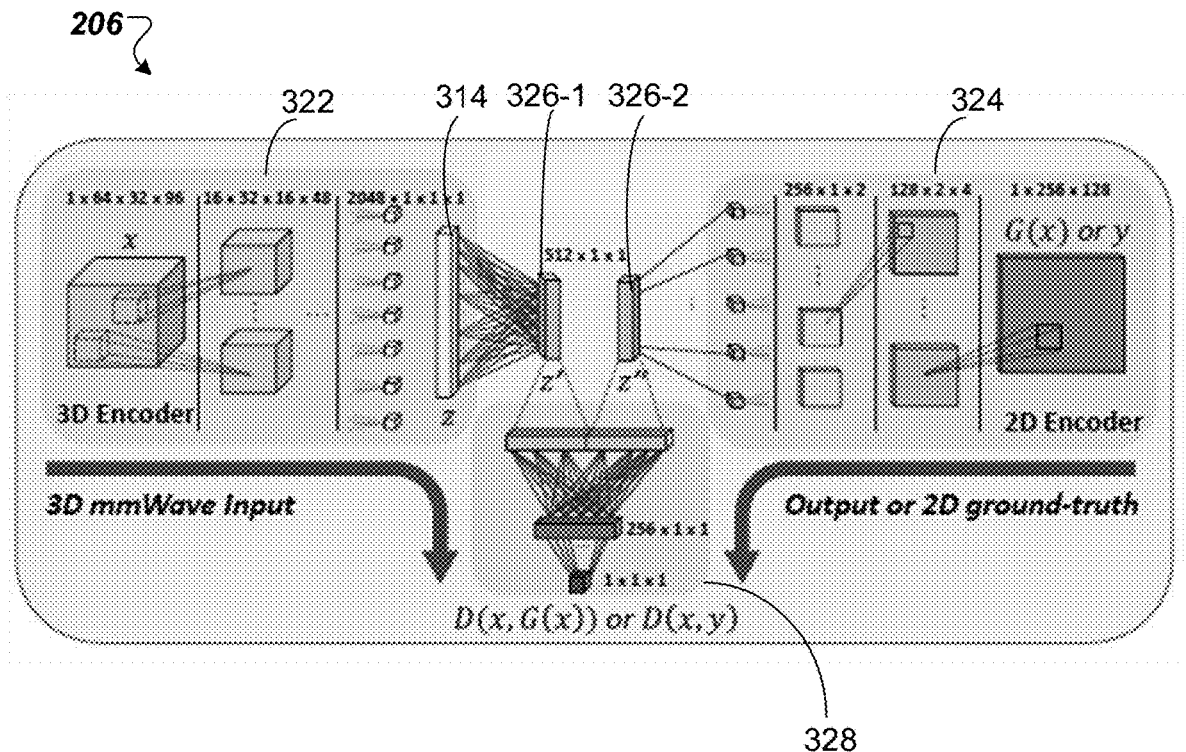
FIG. 3B is a block diagram of a discriminator network that can be implemented within the GAN architecture of FIG. 2, according to embodiments of the present disclosure.

FIG. 3B shows an example of a network architecture of the discriminator 206 of the GAN architecture 200 that can be implemented within a mmWave imaging system according to embodiments of the present disclosure. The discriminator 206 can take two inputs: the 3D radar heat map x and a 2D depth map that either comes from the ground truth y or was generated by the decoder 314 of FIG. 3A as G(x). It may output a probability of the input being real.

In standard GANs, the input and output of the generator typically have the same dimension. Hence, they are generally concatenated and fed as one input to the discriminator that uses a single deep neural network to generate the discriminator output D(x, y) or D(x, G(x)). However, in the GAN network architecture described herein, the input and output of the generator (e.g., generator 310 of FIG. 3A) have different dimensions and hence cannot simply be concatenated and mixed together by one neural network.

To address this, the discriminator 206 can implement two encoder networks ("encoders"). More specifically, discriminator 206 can include a 3D encoder 322 and a 2D encoder 324. The 3D encoder 322 can have the same or similar architecture as the encoder 312 described above with reference to FIG. 3A. The 3D encoder 322 can generate a first encoded input, z', 326-1 by encoding voxels within the 3D radar heat map. The 2D encoder 324 can take the 2D depth map y or G(x) as input and generate a second encoded input, z", 326-2 by encoding pixels of the 2D depth map. In some embodiments, the 2D encoder 324 includes 7 convolutional layers.

More specifically, the encoded input 326-1 can be generated by converting the encoded input z 316 using a fully connected layer to ensure that the encoded inputs 326-1 and 326-2 map to the same feature space prior to mixing. The encoded inputs 326-1 and 326-2 can then be used to generate a discriminator output using the discriminator output component 328. In one embodiment, the encoded inputs 326-1 and 326-2 can have a size of 512×1×1 (i.e., 1D vectors). More specifically, the component 328 can generate a concatenation based on the encoded inputs 326-1 and 326-2 to, apply a first intermediate layer (e.g., a first fully connected layer) to the concatenation (which can generate an object having a size of 256×1×1), and then apply a second intermediate layer (e.g., a second fully connected layer) to obtain an output probability of the discriminator output. For example, prior to the concatenation, the encoded input 326-1 can be mapped to a 1D vector having a feature space in common with the encoded input 326-2.

The output of the discriminator D and generator G may be used to calculate the loss function £(G) defined previously. During training, D and G may be optimized to minimize this loss function. As mentioned earlier, GANs may be powerful at creating realistic images by capturing the high frequency components of the scene. However, they may be less accurate when it comes to low frequency components such as coarse object location, orientation, etc. The reason for this may be that the objective of the generator G is to simply create high-resolution images that look real to the discriminator D rather than accurate images with respect to metrics like location, orientation, etc. To address this, an $£_1$ loss term or a perceptual loss term $£_p$ may be added. $£_1$ loss is defined as the $l_1$ distance between the ground truth and the output of the GAN (e.g., Eq. 1 below):

$$£_1(G) = E\|y - G(x)\|_1 \quad (1)$$

$$£_p(G) = E\|VGG(y) - VGG(G(x))\|_1 \quad (2)$$

$$£_H(G) = £(G) + \lambda_1 £_1 + \lambda_p £_p \quad (3)$$

For perceptual loss, a pre-trained network (e.g. a VGG network) may be used to extract perceptual features of the image. The ground truth and output may be passed through this network and $£_p$ may be computed as the $l_1$ distance between the feature maps that the network outputs (Eq 2). In some embodiments, it may be preferable to avoid directly using $£_1$ loss and instead use perceptual loss. This is because the difference between individual pixel values in images carries little to no perceptual information. Unlike images, pixel values in depth maps may correspond to depth and may carry perceptual information about vehicles, such as orientation and shape. Hence, the mmWave imaging system may maintain a combination of three losses (Eq. 3), where $\lambda_1$ and $\lambda_p$ may be hand-tuned relative weights of the loss functions. Using this loss function can enable the mmWave imaging system to accurately capture both the low and high frequency components in the image. This can result in perceptually interpretable high-resolution images that accurately represent the scene.

As described earlier, the advent of 5G in the mmWave spectrum has led to creation of electronically steerable phased arrays with hundreds of antenna elements. The relatively short wavelength of mmWave signals may allow these phased arrays to have very small form factor. For example, at 60 GHz, a 32×32 array can occupy an 8 cm×8 cm patch.

More specifically, mmWave radar works by transmitting a wireless signal and receiving back the reflections from various objects in the scene. It operates in the high frequency bands such as 24 GHz, 60 GHz, and 77 GHz and may use techniques like FMCW and antenna arrays to separate the received reflections. The antenna arrays may be electronically steered to capture and separate reflections from the scene based on their spatial direction ($\varphi$, $\theta$) whereas FMCW may be used to separate reflections based on the range ($\rho$) from the reflecting object. This allows the mmWave imaging system to compute a 3D heat map $x(\varphi, \theta, \rho)$ where each point represents the energy reflected from a voxel in space.

The ability to create very narrow beams and steer them electronically may enable mmWave phased array radios to image 3D objects in the environment. According to antenna array theory, for an N×N array, the mmWave imaging system can compute the reflected power along the spherical angles $\theta$ (elevation) and $\phi$ (azimuth) by adding a phase shift to the signal received on every antenna before combining the signals. Formally, $$x(\theta, \phi) = \sum_{k}^{N}\sum_{l}^{N} S_{k,l} e^{j\frac{2\pi}{\lambda}[(k-1)d\sin(\theta)\cos(\phi) + (l-1)d\cos(\theta)]}$$

where $\lambda$ is the wavelength, $d = \lambda/2$ is the separation between consecutive elements, and $S_{k,l}$ is the signal received on the antenna element index by (k, l) in the 2D array.

The third dimension (the range $\rho$) may be obtained by measuring the time of flight of the radar waveform echo. The huge bandwidth available in the mmWave band may allow the mmWave imaging system to estimate range with high-resolution. In the mmWave imaging system design, a low power Frequency Modulated Continuous Wave (FMCW) is transmitted at 60 GHz. The mmWave imaging system may have a heterodyne architecture where the FMCW waveform may be first generated at the baseband and then up-converted to mmWave frequencies. The received signal may be down-converted to baseband for radar waveform processing. This may allow the mmWave imaging system to easily change the frequency band of operation to 24 GHz or 77 GHz by changing the mmWave front-end. The time of flight can be extracted from the FMCW using a simple fast Fourier transform (FFT) on the beat signal sampled below 1 MHz. This may allow the mmWave imaging system to reconstruct a 3D heat map x(θ, φ, ρ).

The angular resolution for mmWave imaging may be set by the size (aperture) of the antenna array and the range resolution may be set by the bandwidth of the radar waveform. Specifically, for a bandwidth B, the range resolution is given by c/2B where c is the speed of light. The range resolution for the system described in the present disclosure is 10 cm (with B=1.5 GHz). Resolution along the other two dimensions may be set by the Rayleigh limit. The Rayleigh limit of the angular resolution is given by πλ/L where L is the antenna aperture given by L=Nλ/2. Practical mmWave systems may have a relatively small aperture which may limit the resolution, resulting in the image getting convolved with a 2D sin c function. mmWave signals may not scatter as much as light and may mainly reflect off surfaces. This leads to specularity, where some reflections may not trace back to the mmWave receiver. Due to multipath propagation, some reflections may bounce off the street and other obstacles and trace back to the mmWave receiver.

In the scene generation stage, scenes of vehicles may be simulated based on two types of datasets: 3D computer-aided design (CAD) model for an autonomous driving dataset and a street view video recordings dataset (e.g., such as Cityscapes or the like). The 3D CAD models can provide precise 3D meshes of a wide variety of vehicles, while the street view photos can offer references for vehicle placement through object masks that are captured (e.g., with Mask R-CNN). In the ray tracing stage, the radar cross-sections of the scene can be modeled. Occluded bodies may be removed through spherical projection. Then, the radar cross-sections of the remaining surfaces may be modeled as a cluster of point reflectors with different densities and reflectivities. Corner areas with more scattering and specular surface areas whose reflection will not be received can be pinpointed, and point reflectors to perform standard ray tracing can be modeled. Finally, in the ground truth and mmWave image generation stage, the received signal may be simulated based on the point reflector model with background noise introduced. Thermal noise can be added to the FMCW signals and error can be introduced in antenna element positions to better match the real data. By applying standard mmWave image processing as described above, 3D mmWave heat map can be obtained. The ground truth 2D depth map can be generated through spherical projection of the 3D scene and coloring the pixels according to the depth.

The output of the discriminator and generator may be used to calculate the loss function £(H) as described previously. The generator and discriminator may be trained end-to-end by optimizing the loss function. The standard back-propagation algorithm can be followed. In the depicted embodiment, the training dataset is formed of 3000 synthesized images of vehicles with a batch size of 4. 120 different vehicle models are used while varying the orientation and location of each vehicle. After 170 epochs, the mmWave imaging GAN can be fine-tuned using 100 real mmWave images. The mmWave imaging GAN is then tested 500 synthesized images and 140 real images. In the test methodology, standard k-fold cross-validation where k=5 can be followed. The examples in the test dataset are not used during training. The real images come from 40 different vehicle models with various orientations and locations.

The dataset can be collected using a mmWave imaging platform. A 2D antenna array with a 60 GHz radio can be emulated and can transmit a standard radar waveform to capture 3D mmWave heat maps. A baseline stereo camera system can be used capture the corresponding high-resolution 2D depth maps for ground truth. A camera can be placed on a high precision linear slider to capture multiple images of the scene, and a standard stereo image processing algorithm can be applied to extract the 2D depth maps. In the ground truth, pixels that do not belong to the objects (e.g., vehicles) of interest can be filtered out using labeled object masks.

Figure 4:
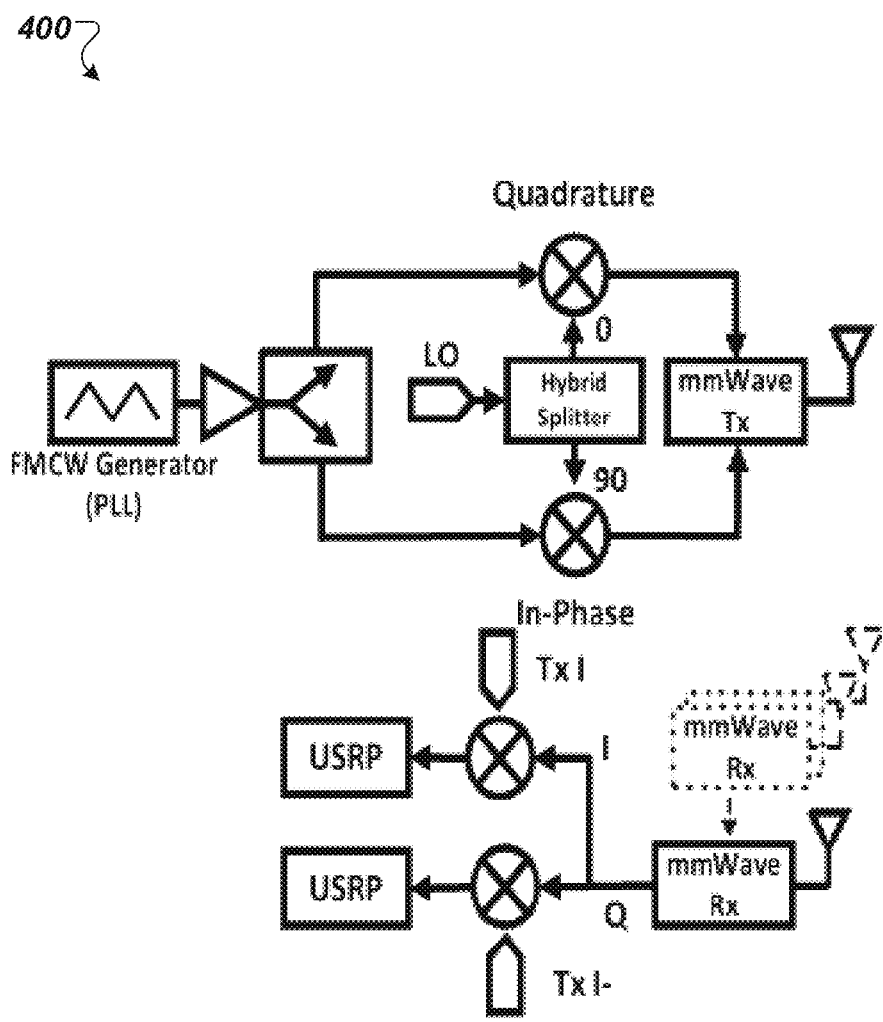
FIG. 4 illustrates a frequency-modulated continuous wave (FMCW) radar circuit, according to embodiments of the present disclosure.

FIG. 4 illustrates a schematic diagram 400 of an FMCW radar circuit according to embodiments of the present disclosure. For the mmWave radar circuit, heterodyne architecture can be implement as shown. The same FMCW waveform at baseband can be generated, with a bandwidth of 1.5 GHz sweeping from 0.1 GHz to 1.6 GHz. The waveform can then be up-converted to have a center frequency of 60.15 GHz using quadrature modulation through a 60 GHz radio frontend (e.g., such as a Pastemack 60 GHz radio frontend). The resulting signal can sweep from 59.4 GHz to 60.9 GHz and the other unwanted sideband can be suppressed. The FMCW receiver has a reciprocal architecture. In the receiver, quadrature demodulation can be implemented and the I and Q components of the complex signal with two synchronized Universal Software Radio Peripherals (USRPs) for direct phase measurement and shifting can be sampled. The reflected signals at 60 GHz can first be down-converted to the baseband through quadrature demodulation to get 90° phase-shifted I and Q channels. They can be fed separately into RF mixers along with the original baseband FMCW waveforms to extract the beat signal, whose frequency is proportional to the time-of-flight of the radar waveform in the air. The I and Q components of the complex beat signal can be sampled with two USRP software-defined radios for direct phase measurement. A command clock can be used to enforce frequency and phase synchronization throughout the radar circuit.

The continuously sampled complex beat signal can then be aligned to the antenna portions in the array. In this process, the SAR trajectory can be tracked by leveraging the phase shift in the residual direct path leakage. A fast Fourier transform (FFT) and beamforming can then be applied in sequence to estimate the reflected signal power from every voxel x(θ, φ, ρ) to generate the 3D mmWave radar heat map.

Figure 5:
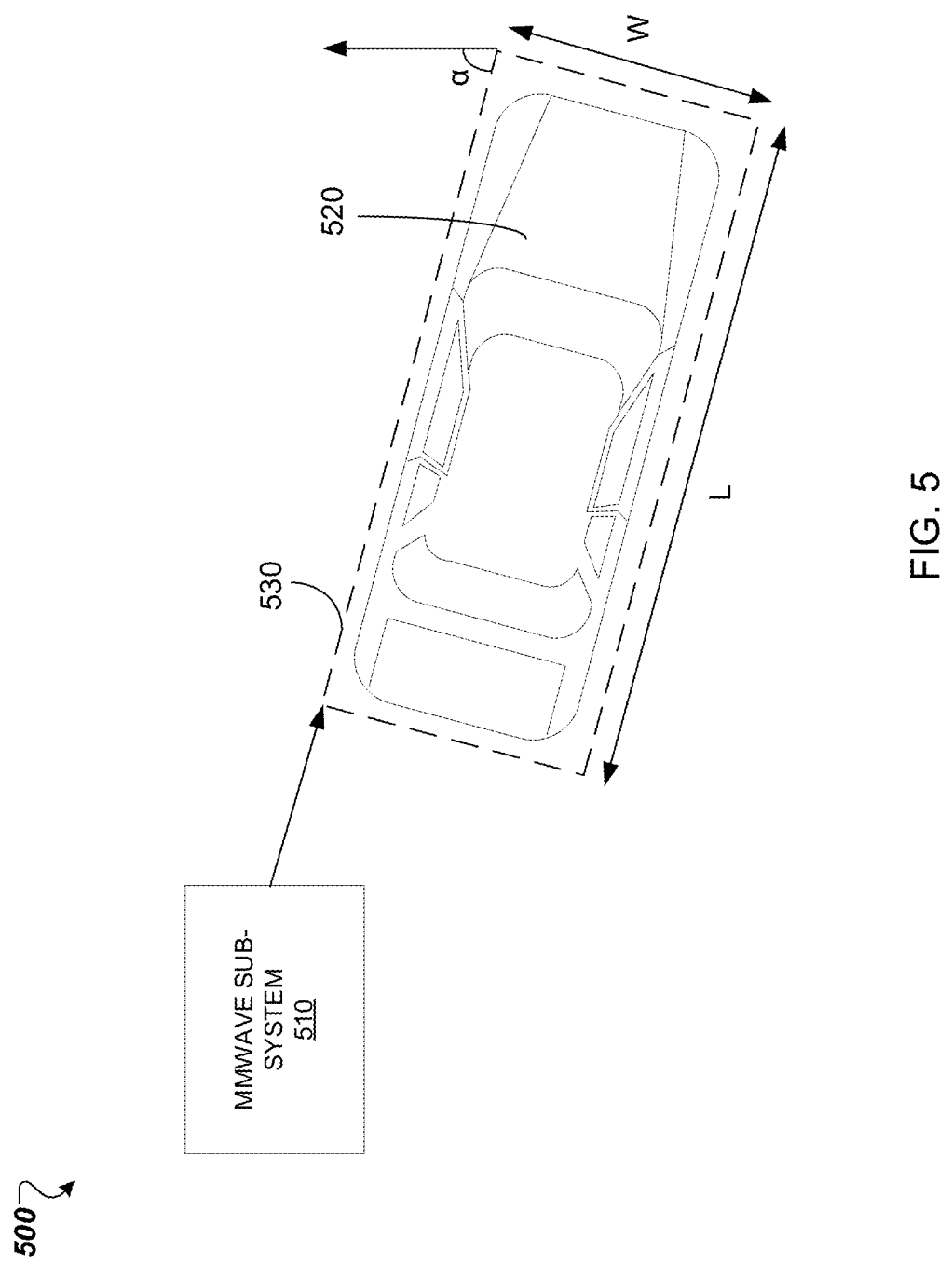
FIG. 5 illustrates a top view of an object that can be captured by a neural network-based millimeter-wave (mm-Wave) imaging system, according to embodiments of the present disclosure.

FIG. 5 illustrates a top view of a system 500 according to embodiments of the present disclosure. The system includes an mmWave sub-system 510 and an object 520 surrounded by a bounding box 530. The bounding box 530 has a length L, a width W. Although the object 520 is shown in this illustrate example as being a vehicle (e.g., vehicle), the object 520 can be any suitable object in accordance with the embodiments described herein. Orientation can be measured from the bounding box 530.

Ranging performance of the mmWave sub-system 510 and radar to the ground truth can be compared. As shown, the closest corner of the bounding box 530 to the mmWave sub-system 510 can be used as basis for the ranging distance in the evaluation since the corners of the object 520 can scatter mmWave signals, and therefore, they can be reliably detected by the mmWave sub-system 510 despite specular reflections from other parts of the object 520. The performance on the estimation of size can be evaluated by comparing the accuracy in length, width and height of the object 520. For the 3D radar heat map, the dimensions of the object 520 can be measured as observed from the radar reflections. For the output from the mmWave sub-system 510, the dimensions can be measured by projecting the 2D depth map into a 3D point cloud. The orientation can be measured as the angle α between the longer edge of the bounding box 530 and the geographic north as viewed in the top view shown in FIG. 5. The 2D depth map or the 3D heat map can be projected along the top view of the scene using rotational transformations.

The shape of the object 520 can be evaluated by comparing the boundary of the object 520 as viewed along the front-view (i.e., along the view of the 2D depth-map). A variety of metrics can be considered. For example, the percentage of the surface of the object 520 that is missed may be indicative of specularity effects observed in the image. As another example, the percentage of fictitious reflectors may be indicative of artifacts such as multipath and ambient reflections in the image. As mentioned above, due to specularity effects, mmWave radars may suffer from large errors due to either specular reflections which lead to underestimation of the vehicle dimensions, or artifacts such as multipath and environmental reflections which results in overestimation. As a result, mmWave radars may miss a large portion of the vehicle's surface. For example, mmWave radar may be less capable of accurately estimating the bounding box 530. However, the mmWave sub-system 510 can learn to fill in the holes in the radar heat map to account for specularity and reject artifacts to retain only the true reflections from the vehicle. The mmWave sub-system 510 also achieves lower orientation error than mmWave radar. Accordingly, the mmWave sub-system 510 can effectively learn to reject the ghost reflections from the environment.

The skip connections in the design of the mmWave sub-system 510 allow for direct transfer of this ranging information from input to output, allowing the mmWave sub-system 510 to accurately range the vehicle with small error. Further, the mmWave sub-system 510 achieves lower size (e.g., length, width, and height) errors than mmWave radar.

Further, to determine the utility of the mmWave sub-system 510, the mmWave sub-system 510 can be compared against an identical neural network trained only with the $\pounds_1$ based loss function, $\pounds=\pounds_1+\lambda_p\pounds_p$, as defined in Eqs. (1) and (2). Though the $\pounds_1$ loss baseline may achieve good performance in terms of ranging error, $\pounds_1$ loss may not be able to capture the high frequency components of the output shape, which may result in blurring of boundaries. As a result, the errors in estimated size, orientation and fictitious reflectors may be high for $\pounds_1$ loss, and thus the mmWave sub-system 510 may achieve higher performance gains across these metrics. These results may be due to the GAN architecture in the mmWave sub-system 510. The mmWave sub-system 510 can further outperform the nearest neighbor baseline, achieving an improvement in both high visibility and low visibility scenes.

Table I below shows quantitative results of an mmWave imaging system in accordance with the embodiments described herein.

Table I

While the fog and rain particles do introduce additional environmental reflections in the radar heat map, the mmWave imaging system in accordance with the embodiments described herein can ignore environmental reflections and extract out only the key generative features for the vehicle in the scene. The ability of the mmWave imaging system to create accurate images in fog and rain, despite never having been trained with such examples, may demonstrate the favorable propagation characteristics of mmWave signals in inclement weather conditions to build a model that can generalize between different environments and weather conditions.

Though the depicted embodiments of the mmWave imaging system in the present disclosure use SAR to collect raw mmWave heat maps, the mmWave imaging system may implement other methods of collecting raw mmWave heat maps. In a preferable embodiment, the mmWave imaging system may capture mmWave heat maps in real time, even as the vehicles may be moving. Note that Doppler shifts introduced by moving vehicles in the scene may not affect the mmWave imaging system performance, since shifts due to the Doppler effect can be estimated and corrected for using a triangular FMCW waveform.

Though in the embodiments depicted in the present disclosure the mmWave imaging system is trained to specifically reconstruct vehicles, the mmWave imaging system may be trained to reconstruct other objects, such as pedestrians, bicycles, traffic signs, and the like. In some embodiments, a separate classification network can isolate reflections from each class of objects, and then employ a separate GAN model to reconstruct the shape of each object.

Figure 6A:
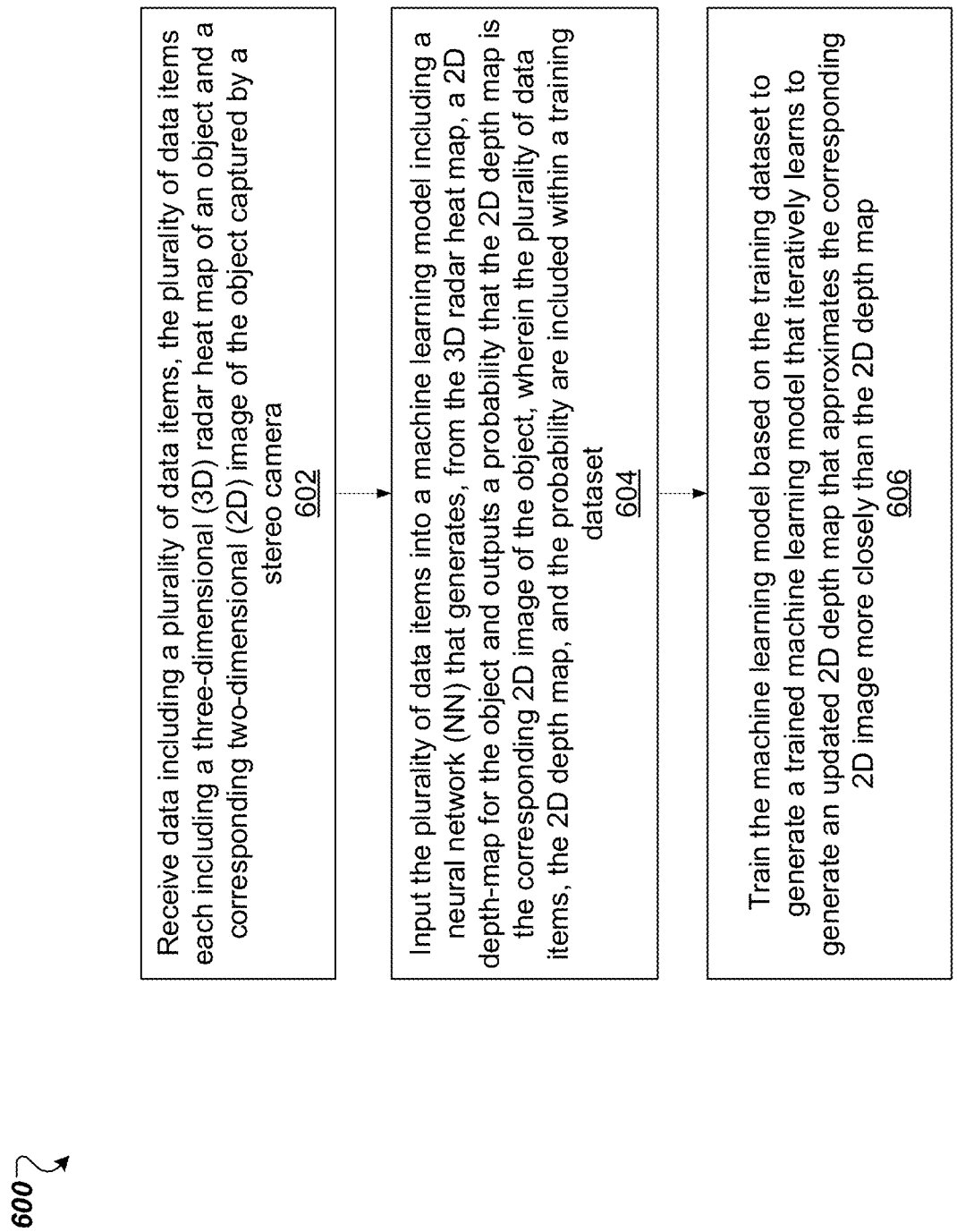
FIG. 6A is a flow diagram of an example method for training a neural network architecture of a neural network-based millimeter-wave (mmWave) imaging system, according to embodiments of the present disclosure.

FIG. 6A is a flow diagram of an example method 600 for training a machine learning model, according to embodiments of the present disclosure. The method 600 may be performed by processing logic that may comprise hardware (e.g., circuitry, dedicated logic, programmable logic, microcode, etc.), software (such as instructions running on the processor), firmware or a combination thereof. In one embodiment, at least aspects of the mmWave imaging system 100 of FIG. 1 runs on one or more computing device (such as the computer system 700 of FIG. 7) in order to perform the method 600. As will be described in further detail, a machine learning model can be trained to improve imaging quality by transforming low-resolution 3D heat maps into high-resolution 2D depth maps with pixels corresponding to depth, in contrast to standard vision-based learning for image-to-image translation. More specifically,

| Experiment | Systems | Error in Ranging | Error in Length | Error in Width | Error in Height | Error in Orientation | % Fictitious Reflections | % Car Surface Missed |
|---|---|---|---|---|---|---|---|---|
| Clean Air | HawkEye | 30 cm | 47 cm | 29 cm | 9 cm | 27° | 1.5% | 12.9% |
| | mmWave | 53 cm | 179 cm | 89 cm | 45 cm | 64° | 15.6% | 30.5% |
| | $L_1$ Based Loss | 40 cm | 97 cm | 76 cm | 13 cm | 37° | 2.5% | 13.1% |
| | Nearest Neighbor | 90 cm | 114 cm | 70 cm | 17 cm | 68° | 3.5% | 16.0% |
| Fog | HawkEye | 50 cm | 83 cm | 44 cm | 11 cm | 29° | 2.5% | 15.4% |
| | mmWave | 67 cm | 222 cm | 99 cm | 53 cm | 72° | 20.9% | 31.9% |
| | $L_1$ Based Loss | 60 cm | 108 cm | 80 cm | 12 cm | 38° | 3.5% | 13.8% |
| | Nearest Neighbor | 121 cm | 117 cm | 76 cm | 18 cm | 45° | 3.6% | 22.3% |
| Synthesized | HawkEye | 23 cm | 64 cm | 37 cm | 8 cm | 30° | 1.3% | 10.2% |
| | mmWave | 29 cm | 182 cm | 77 cm | 31 cm | 62° | 10.8% | 19.2% |
| | $L_1$ Based Loss | 20 cm | 113 cm | 73 cm | 14 cm | 47° | 3.4% | 9.3% |
| | Nearest Neighbor | 81 cm | 81 cm | 57 cm | 13 cm | 64° | 5.2% | 17.5% | the machine model can be trained to address poor resolution, high specularity, multipath reflections, etc. that can be attributable to radar imaging.

At block 602, the processing logic receives data including a plurality of data items, the plurality of data items each including a three-dimensional (3D) radar heat map of an object and a corresponding two-dimensional (2D) image of the object captured by a stereo camera. The 3D radar heat map can be generated by a radar imaging system. In some embodiments, the 3D radar heat map can be a 3D mmWave heat map, which can be generated by a mmWave imaging system that captures radio frequency (RF) energy reflected from 3D points in space. The 3D radar heat map can have a low-resolution. The 3D heat map can be generated based on an image taken of the object by an imaging apparatus of the mmWave imaging system. In some embodiments, the imaging apparatus can include a stereo camera. In some embodiments, the imaging apparatus can include a LiDAR apparatus. In some embodiments, the image of the object can be taken within a scene or environment with poor visibility conditions. For example, the object can be a vehicle, which can be in a scene with fog, rain, etc.

At block 604, the processing logic inputs the plurality of data items into a machine learning model including a neural network (NN) that generates, from the 3D radar heat map, a 2D depth-map for the object and outputs a probability that the 2D depth map is the corresponding 2D image of the object, wherein the plurality of data items, the 2D depth map, and the probability are included within a training dataset. Respective pixels of the 2D depth map represent distance with respect to a location from the radar imaging system (e.g., the mmWave radar imaging system) that generated the 3D heat map.

At block 606, the processing logic trains the machine learning model based on the training dataset to generate a trained machine learning model that iteratively learns to generate an updated 2D depth map that approximates the corresponding 2D image. In some embodiments, training the machine learning model can further include fine-tuning the trained machine learning model using ground truth or real image data.

In some embodiments, the machine learning model is a generative adversarial network (GAN) including a generator network that generates the 2D depth map and a discriminator network that, based on the 2D depth map and the corresponding 2D image of the object, outputs the probability that is used to train the machine learning model. For example, the GAN can be a conditional GAN (cGAN). In some embodiments, other neural network architectures can be employed (e.g., a perceptron (P), feed forward (FF) Markov Chain (MC), echo state network (ESN), or the like).

In the case where the machine learning model is a GAN, training the machine learning model at block 606 can include training the generator network and training the discriminator network. For example, the generator network can implement an encoder-decoder architecture and the decoder network can implement an encoder-encoder architecture.

For example, training the generator network can include training an encoder network to encode voxels within the 3D radar heat map into a one-dimensional (1D) vector, training a decoder network to decode the 1D vector into the 2D depth map, representing depth with respect to a location from a radar imaging system, and integrating, using a heat map-to-depth map transformation, radio frequency (RF) range information, which is received with the 3D radar heat map. More specifically, the encoder network can include a set of convolutional neural network (NN) layers, the decoder network can include a set of transposed convolutional NN layers, and the RF range information can be received, with the 3D radar heat map, within a layer of the of the set of transposed convolutional NN layers. For example, the layer of the set of transposed convolutional NN layers can be within a last three layers of the set of transposed convolutional NN layers. One or more skip connections between the encoder and the decoder may allow for information in an early layer to fast-forward directly to output layers. The heat map-to-depth map transformation can be performed to address dimension mismatch.

Training the encoder network can further include increasing, with each successive layer of the set of convolutional NN layers, increasing a number of channels of the successive layer, as a 3D kernel of the 3D radar heat map decreases towards the 1D vector. Training the decoder network can further include decreasing, with each successive layer of the set of transposed convolutional layers, a number of channels of the successive layer, as a 2D kernel increases towards the 2D depth map.

Training the discriminator network can include training a first encoder network to encode voxels within the 3D radar heat map into a first one-dimensional (1D) vector, training a second encoder network to encode pixels of the 2D depth map into a second 1D vector, mapping the first 1D vector to a third 1D vector having a feature space in common with the second 1D vector, concatenating the third 1D vector with the second 1D vector to generate a fourth 1D vector, and mapping the fourth 1D vector to the output of the discriminator network. More specifically, the first encoder network can include a first set of convolutional NN layers, the second encoder network can include a second set of convolutional neural network layers, the first 1D vector can be mapped to the third 1D vector using a first fully connected NN layer, and the fourth 1D vector can be mapped to the output of the discriminator network through one or more second fully connected NN layers.

Integrating the RF range information can include, for each 2D spatial location in the 3D radar heat map, assigning a depth as a location of a largest signal strength value along a depth dimension, choosing a set of the largest signal strength values, creating a set of channels of the 2D depth map of an equivalent number to the set of the largest signal strength values, and concatenating the set of channels of the 2D depth map to a feature map of equivalent dimension within the decoder network. For example, the equivalent number can be a number between 5 and 12, inclusive.

Training the machine learning model can further include minimizing a combined loss function that is composed of three separate loss functions. The three separate loss functions can include a primary loss function, $\pounds(G)$, including an objective function that the discriminator network seeks to maximize and the generator network seeks to minimize, an $\pounds_1$ loss function including an $l_1$ distance between the corresponding 2D image and the output, and a perceptual loss, $\pounds_p$, including an $l_1$ distance between features maps that the GAN generates. Further details regarding FIG. 6A are described above with reference to FIGS. 1-3.

Figure 6B:
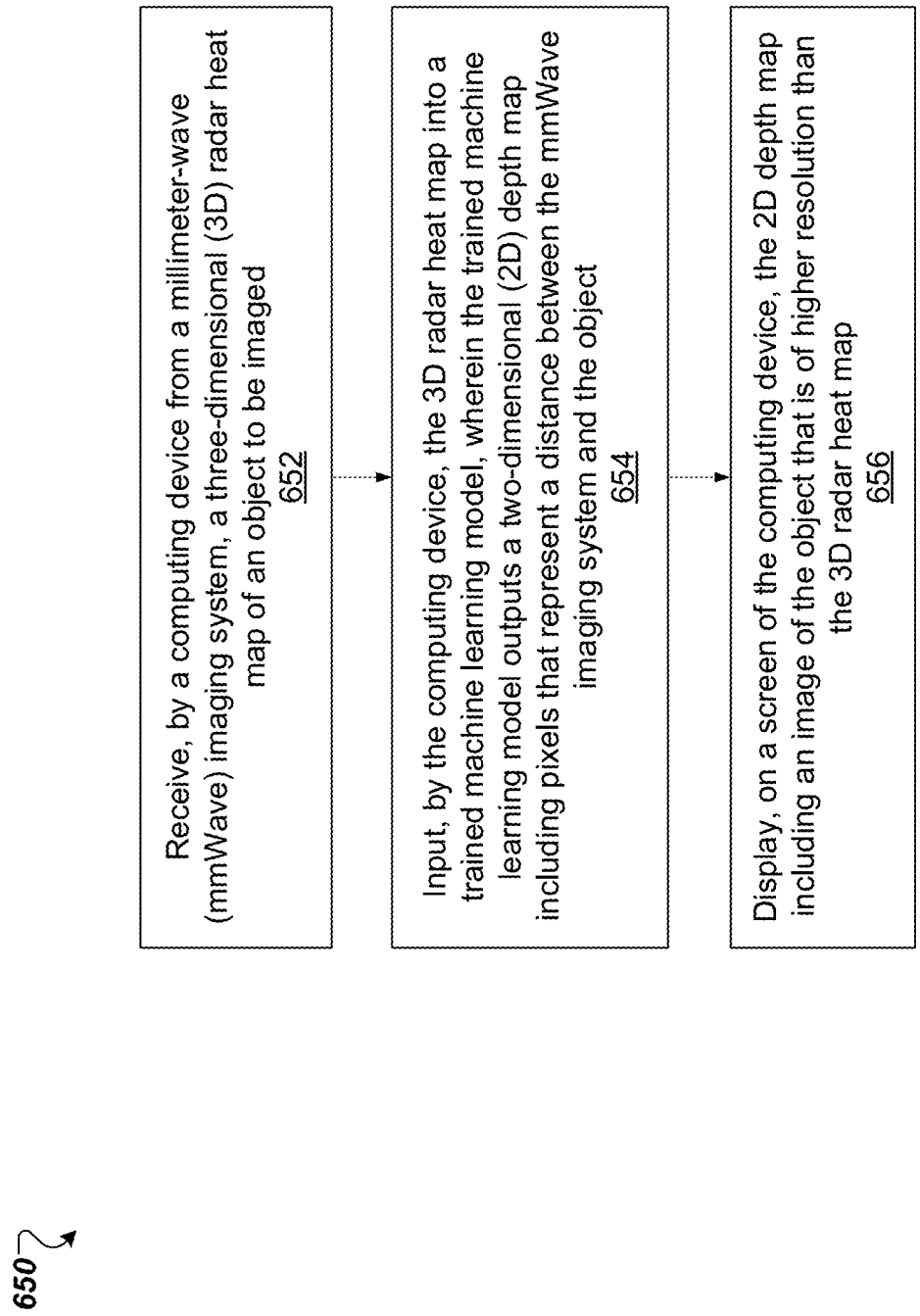
FIG. 6B is a flow diagram of an example method for implementing an inference stage using the neural network architecture trained by the method of FIG. 6A, according to embodiments of the present disclosure.

FIG. 6B is a flow diagram of an example method 650 for implementing an inference stage using the machine learning model trained by the method of FIG. 6A, according to embodiments of the present disclosure. The method 650 may be performed by processing logic that may include hardware (e.g., circuitry, dedicated logic, programmable logic, microcode, etc.), software (such as instructions running on the processor), firmware or a combination thereof. In one embodiment, at least aspects of the mmWave imaging system 100 of FIG. 1 runs on one or more computing device (such as the computer system 700 of FIG. 7) in order to perform the method 650.

At block 652, the processing logic receives, by a computing device from a mmWave imaging sub-system, a three-dimensional (3D) radar heat map of an object to be imaged by a computing device from a millimeter-wave (mmWave) imaging system. The object can be within a scene or environment with poor visibility conditions, such as rain, fog, etc. More specifically, the mmWave imaging system can include a synthetic aperture radar (SAR) that generates the 3D radar heat map by emulating a large antenna. For example, generating the 3D radar heat map can include radiating the SAR with a frequency modulated carrier wave (FMCW) in a high-frequency band (e.g., between 20 gigahertz (GHz) and 80 GHz), electronically steering the SAR to capture multiple separate reflections from the object, and processing mmWave signals reflected off of the object using FMCW demodulation to generate the 3D radar heat map. The 3D radar heat map can include spatial direction and range from the object.

At block 654, the processing logic inputs the 3D radar heat map into a trained machine learning model, wherein the trained machine learning model outputs a two-dimensional (2D) depth map including pixels that represent a distance between the mmWave imaging system and the object. The 2D depth map can capture a shape, size, and orientation of the object commensurate with a 2D image taken of the object with a stereo camera.

The trained machine learning model, as described in detail herein above, has been trained to generate a 2D depth map that approximates a ground truth object by addressing, e.g., poor resolution, high specularity and multipath reflections that can be attributable to mmWave imaging, such as in poor imaging environments. Accordingly, the 2D depth map output by the trained machine learning model a high-resolution representation of the object inferred based on potentially low-resolution/low-quality mmWave imaging and/or objects located in environments with poor visibility. In some embodiments, the trained machine learning model includes a trained generator network of a generative adversarial network (GAN).

At block 656, the processing logic display, on a display screen, the 2D depth map including an image of the object that is of higher resolution than the 3D radar heat map.

Figure 7:
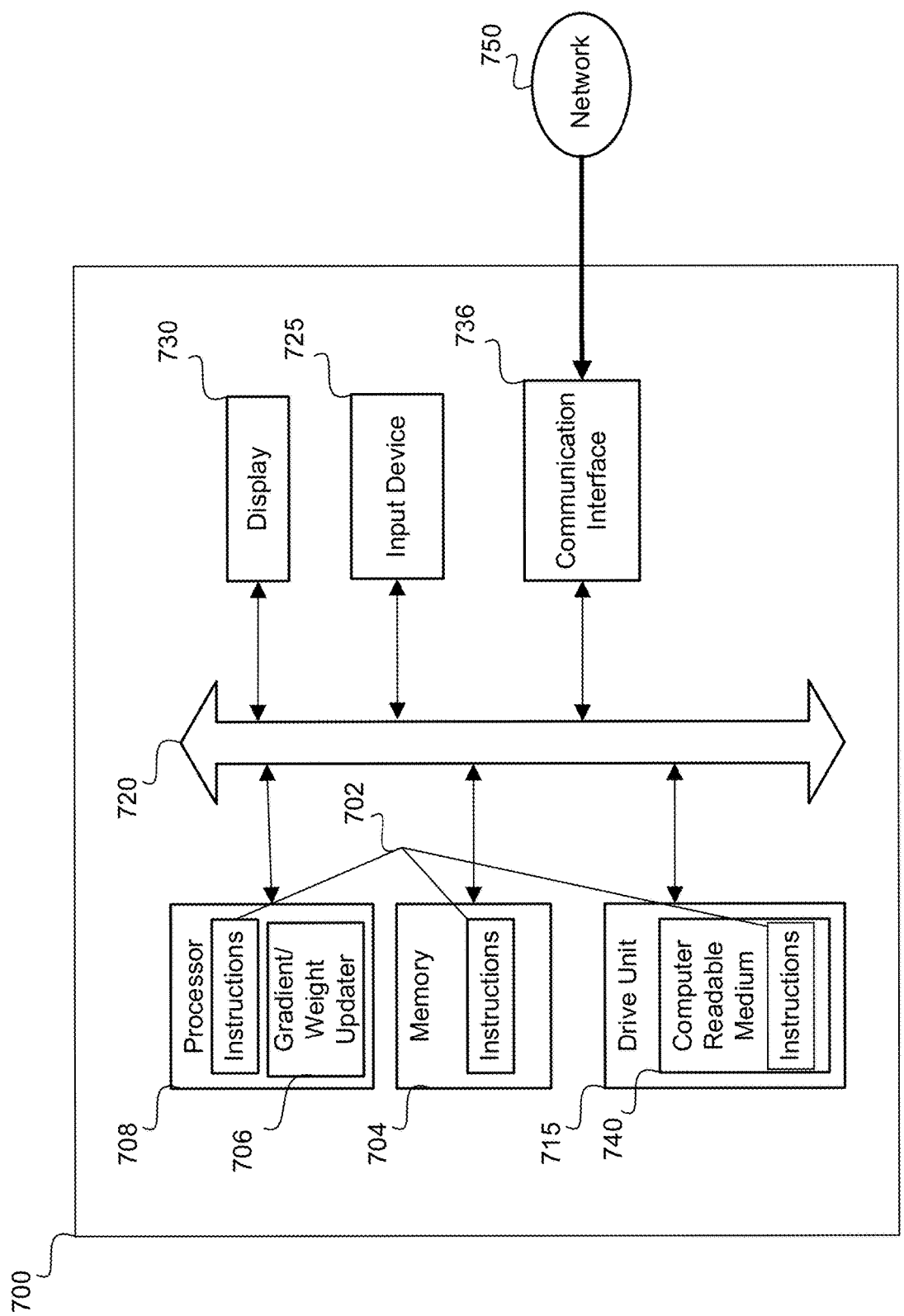
FIG. 7 is a block diagram of an example computer system in which embodiments of the present disclosure can operate.

FIG. 7 is a block diagram of an example computer system 700 in which embodiments of the present disclosure can operate. For example, the computing system 700 can be a computing device that executes a neural network (NN) architecture, such as a generative adversarial network (GAN) (e.g., cGAN) or other NN architecture discussed with reference to FIGS. 1-2, 3A, and 3B, in order to train a machine learning model to process and generate images of objects, such as 2D depth maps, in challenging visibility conditions. The computer system 700 may include an ordered listing of a set of instructions 702 that may be executed to cause the computer system 700 to perform any one or more of the methods or computer-based functions disclosed herein. The computer system 700 may operate as a stand-alone device or may be connected to other computer systems or peripheral devices, e.g., by using a network 750.

In a networked deployment, the computer system 700 may operate in the capacity of a server or as a client-user computer in a server-client user network environment, or as a peer computer system in a peer-to-peer (or distributed) network environment. The computer system 700 may also be implemented as or incorporated into various devices, such as a personal computer or a mobile computing device capable of executing a set of instructions 702 that specify actions to be taken by that machine, including and not limited to, accessing the internet or web through any form of browser. Further, each of the systems described may include any collection of sub-systems that individually or jointly execute a set, or multiple sets, of instructions to perform one or more computer functions.

The computer system 700 may include a memory 704 on a bus 720 for communicating information. Code operable to cause the computer system to perform any of the acts or operations described herein may be stored in the memory 704. The memory 704 may be a random-access memory, read-only memory, programmable memory, hard disk drive or other type of volatile or non-volatile memory or storage device.

The computer system 700 may include a processor 708, such as a central processing unit (CPU) and/or a graphics processing unit (GPU). The processor 708 may include one or more general processors, digital signal processors, application specific integrated circuits, field programmable gate arrays, digital circuits, optical circuits, analog circuits, combinations thereof, or other now known or later-developed devices for analyzing and processing data. The processor 708 may implement the set of instructions 702 or other software program, such as manually-programmed or computer-generated code for implementing logical functions. The logical function or system element described may, among other functions, process and/or convert an analog data source such as an analog electrical, audio, or video signal, or a combination thereof, to a digital data source for audio-visual purposes or other digital processing purposes such as for compatibility for computer processing.

The computer system 700 may also include a disk (or optical) drive unit 715. The disk drive unit 715 may include a non-transitory computer-readable medium 740 in which one or more sets of instructions 702, e.g., software, can be embedded. Further, the instructions 702 may perform one or more of the operations as described herein. The instructions 702 may reside completely, or at least partially, within the memory 704 and/or within the processor 708 during execution by the computer system 700.

The memory 704 and the processor 708 also may include non-transitory computer-readable media as discussed above. A "computer-readable medium," "computer-readable storage medium," "machine readable medium," "propagated-signal medium," and/or "signal-bearing medium" may include any device that includes, stores, communicates, propagates, or transports software for use by or in connection with an instruction executable system, apparatus, or device. The machine-readable medium may selectively be, but not limited to, an electronic, magnetic, optical, electro-magnetic, infrared, or semiconductor system, apparatus, device, or propagation medium.

Additionally, the computer system 700 may include an input device 725, such as a keyboard or mouse, configured for a user to interact with any of the components of computer system 700. It may further include a display 730, such as a liquid crystal display (LCD), a cathode ray tube (CRT), or any other display suitable for conveying information. The display 730 may act as an interface for the user to see the functioning of the processor 708, or specifically as an interface with the software stored in the memory 704 or the drive unit 715.

The computer system 700 may include a communication interface 736 that enables communications via the communications network 710. The network 710 may include wired networks, wireless networks, or combinations thereof. The communication interface 736 network may enable communications via a number of communication standards, such as 802.11, 802.17, 802.20, WiMax, cellular telephone standards, or other communication standards.

Accordingly, the method and system may be realized in hardware, software, or a combination of hardware and software. The method and system may be realized in a centralized fashion in at least one computer system or in a distributed fashion where different elements are spread across several interconnected computer systems. A computer system or other apparatus adapted for carrying out the methods described herein is suited to the present disclosure. A typical combination of hardware and software may be a general-purpose computer system with a computer program that, when being loaded and executed, controls the computer system such that it carrying out the methods described herein. Such a programmed computer may be considered a special-purpose computer.

The method and system may also be embedded in a computer program product, which includes all the features enabling the implementation of the operations described herein and which, when loaded in a computer system, is able to carry out these operations. Computer program in the present context means any expression, in any language, code or notation, of a set of instructions intended to cause a system having an information processing capability to perform a particular function, either directly or after either or both of the following: a) conversion to another language, code or notation; b) reproduction in a different material form.

The disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms, operations, and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the disclosure is not described with reference to any particular programming language. It will be appreciated that a variety of programming languages can be used to implement the teachings of the disclosure as described herein.

The disclosure can be provided as a computer program product, or software, that can include a machine-readable medium having stored thereon instructions, which can be used to program a computer system (or other electronic devices) to perform a process according to the disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an implementation" or "one implementation" or "an embodiment" or "one embodiment" or the like throughout is not intended to mean the same implementation or implementation unless described as such. One or more implementations or embodiments described herein may be combined in a particular implementation or embodiment. The terms "first," "second," "third," "fourth," etc. as used herein are meant as labels to distinguish among different elements and may not necessarily have an ordinal meaning according to their numerical designation.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
   receiving, by a processing device operatively coupled to memory, data comprising a plurality of data items, each data item of the plurality of data items comprising a three-dimensional (3D) radar heat map of an object and a corresponding two-dimensional (2D) image of the object captured by a stereo camera;
   inputting, by the processing device, the plurality of data items into a machine learning model comprising a generative adversarial network (GAN) comprising:
      a generator network that generates a 2D depth map for the object by encoding voxels within the 3D radar heat map into a first one-dimensional (1D) vector and decoding the first 1D vector into the 2D depth map, wherein the 2D depth map comprises pixels that each represent a respective distance from a respective location to a radar imaging sub-system; and
      a discriminator network that generates, based on the 3D radar heat map and the 2D depth map, an output comprising a probability that the 2D depth map is the corresponding 2D image of the object; and
   training, by the processing device, the machine learning model based on the plurality of data items to generate a trained machine learning model that iteratively learns, based on the probability, to generate an updated 2D depth map that approximates the corresponding 2D image more closely than the 2D depth map, wherein the training comprises at least one of: training the generator network to generate the 2D depth map or training the discriminator network to generate the output.

2. The method of claim 1, further comprising receiving, by the processing device, the 3D radar heat map from a millimeter-wave (mmWave) imaging sub-system that captures radio frequency (RF) energy reflected from 3D points in space.

3. The method of claim 2, further comprising:
generating, by the processing device, synthesized 2D images of potential objects from a combination of 2D computer-aided design (CAD) models and corresponding scene images;
modeling, by the processing device, radar cross-sections of the potential objects by modeling surfaces as a cluster of point reflectors and performing ray tracing on scattering corners and specular surfaces;
simulating, by the processing device using the radar cross-sections, received mmWave signals of the potential objects using a point reflector model with background noise added in to generate synthesized 3D radar heat maps; and
importing, by the processing device into the machine learning model, displacement data between each synthesized 2D image and each corresponding synthesized 3D radar heat map.

4. The method of claim 1, wherein:
the generator network comprises:
an encoder network, which comprises a set of convolutional NN layers, to encode the voxels within the 3D radar heat map into the first 1D vector; and
a decoder network, which comprises a set of transposed convolutional NN layers, to decode the first 1D vector into the 2D depth map; and
the training further comprises integrating, using a heat map-to-depth map transformation, radio frequency (RF) range information, which is received with the 3D radar heat map, within a given layer of the set of transposed convolutional NN layers.

5. The method of claim 4, wherein the given layer of the set of transposed convolutional NN layers is within a last three layers of the set of transposed convolutional NN layers of the decoder network.

6. The method of claim 4, wherein training the encoder network further comprises, with each successive layer of the set of convolutional NN layers of the encoder network, increasing a number of channels of the successive layer, as a 3D kernel of the 3D radar heat map decreases towards the first 1D vector.

7. The method of claim 4, wherein training the decoder network further comprises, with each successive layer of the set of transposed convolutional NN layers of the decoder network, decreasing a number of channels of the successive layer, as a 2D kernel increases towards the 2D depth map.

8. The method of claim 1, wherein:
the discriminator network comprises:
a first encoder network, which comprises a first set of convolutional NN layers, to encode voxels within the 3D radar heat map into a second 1D vector; and
a second encoder network, which comprises a second set of convolutional NN layers, to encode pixels of the 2D depth map into a third 1D vector; and
the training further comprises:
mapping, using a first fully connected NN layer, the first 1D vector to a fourth 1D vector having a feature space in common with the third 1D vector;
concatenating the fourth 1D vector with the third 1D vector to generate a fifth 1D vector; and
mapping the fifth 1D vector to the output of the discriminator network through one or more second fully connected NN layers.

9. The method of claim 1, wherein the training further comprises minimizing a combined loss function that is composed of three separate loss functions, which comprise:
a primary loss function, $\pounds(G)$, comprising an objective function that the discriminator network seeks to maximize and the generator network seeks to minimize;
an $\pounds_1$ loss function comprising an $l_1$ distance between the corresponding 2D image and the output; and
a perceptual loss, $\pounds_p$, comprising an $l_1$ distance between features maps that the GAN generates.

10. A method comprising:
receiving, by a computing device from a millimeter-wave (mmWave) imaging sub-system, a three-dimensional (3D) radar heat map of an object to be imaged;
inputting, by the computing device, the 3D radar heat map into a trained machine learning model comprising a generative adversarial network (GAN) comprising:
a generator network that generates, from the 3D radar heat map, a two-dimensional (2D) depth map for the object by encoding the 3D radar heat map into a first one-dimensional (1D) vector and decoding the first 1D vector into the 2D depth map; and
a discriminator network that generates, based on the 3D radar heat map and the 2D depth map, an output comprising a probability that the 2D depth map is a corresponding 2D image of the object, and wherein the 2D depth map comprises pixels that each represent a respective distance between the mmWave imaging sub-system and the object; and
displaying, on a display screen by the computing device, the 2D depth map comprising an image of the object that is of higher resolution than the 3D radar heat map.

11. The method of claim 10, further comprising:
radiating a synthetic aperture radar (SAR) of the mmWave imaging sub-system with a frequency modulated carrier wave (FMCW) in a high-frequency band between 20 gigahertz (GHz) and 80 GHz, wherein the SAR emulates a large antenna array;
electronically steering the SAR to capture multiple separate reflections from the object; and
processing mmWave signals reflected off of the object using FMCW demodulation to generate the 3D radar heat map that includes spatial direction and range from the object.

12. The method of claim 10, wherein the 2D depth map captures a shape, size, and orientation of the object commensurate with the corresponding 2D image of the object taken with a stereo camera.

13. A method comprising:
receiving, by a processing device operatively coupled to memory, a three-dimensional (3D) radar heat map of an object from a millimeter-wave (mmWave) imaging sub-system that captures radio frequency (RF) energy reflected from 3D points in space;
generating, by the processing device, synthesized two-dimensional (2D) images of potential objects from a combination of 2D computer-aided design (CAD) models and corresponding scene images;
modeling, by the processing device, radar cross-sections of the potential objects by modeling surfaces as a cluster of point reflectors and performing ray tracing on scattering corners and specular surfaces;

simulating, by the processing device using the radar cross-sections, received mmWave signals of the potential objects using a point reflector model with background noise added in to generate synthesized 3D radar heat maps; and importing, by the processing device into a machine learning model, displacement data between each synthesized 2D image and each corresponding synthesized 3D radar heat map, wherein the machine learning model comprises a neural network (NN) that generates, from the 3D radar heat map, a 2D depth map for the object and outputs a probability that the 2D depth map is a corresponding 2D image of the object, wherein the 2D depth map comprises pixels that each represent a respective distance from a respective location to a radar imaging sub-system.

14. The method of claim 13, wherein the neural network is a generative adversarial network (GAN) comprising a generator network that generates the 2D depth map and a discriminator network that generates the output based on the 3D heat map and the 2D depth map.

15. The method of claim 13, further comprising training, by the processing device, the machine learning model to generate a trained machine learning model that iteratively learns to generate an updated 2D depth map that approximates the corresponding 2D image of the object.

16. The method of claim 15, wherein:
the neural network is a generative adversarial network (GAN) comprising a generator network that generates the 2D depth map, the generator network comprising:
an encoder network, which comprises a set of convolutional NN layers, to encode voxels within the 3D radar heat map into a one-dimensional (1D) vector; and
a decoder network, which comprises a set of transposed convolutional NN layers, to decode the 1D vector into the 2D depth map; and
the training further comprises integrating, using a heat map-to-depth map transformation, radio frequency (RF) range information, which is received with the 3D radar heat map, within a given layer of the set of transposed convolutional NN layers.

17. The method of claim 16, wherein the given layer of the set of transposed convolutional NN layers is within a last three layers of the set of transposed convolutional NN layers of the decoder network.

18. The method of claim 16, wherein:
training the encoder network further comprises, with each successive layer of the set of convolutional NN layers of the encoder network, increasing a number of channels of the successive layer, as a 3D kernel of the 3D radar heat map decreases towards the 1D vector; and training the decoder network further comprises, with each successive layer of the set of transposed convolutional NN layers of the decoder network, decreasing a number of channels of the successive layer, as a 2D kernel increases towards the 2D depth map.

19. The method of claim 16, wherein:
the neural network is a generative adversarial network (GAN) comprising a discriminator network that generates the output based on the 3D heat map and the 2D depth map, the discriminator network comprising:
a first encoder network, which comprises a first set of convolutional NN layers, to encode voxels within the 3D radar heat map into a first one-dimensional (1D) vector; and
a second-encoder network, which comprises a second set of convolutional NN layers, to encode pixels of the 2D depth map into a second-1D vector; and
the training further comprises:
mapping, using a first fully connected NN layer, the first 1D vector to a third 1D vector having a feature space in common with the second 1D vector;
concatenating the third 1D vector with the second 1D vector to generate a fourth 1D vector; and
mapping the fourth 1D vector to the output of the discriminator network through one or more second fully connected NN layers.

20. The method of claim 15, wherein:
the neural network is a generative adversarial network (GAN) comprising a generator network that generates the 2D depth map and a discriminator network that generates the output based on the 3D heat map and the 2D depth map; and
the training further comprises minimizing a combined loss function that is composed of three separate loss functions, which comprise:
a primary loss function, $£(G)$, comprising an objective function that the discriminator network seeks to maximize and the generator network seeks to minimize;
an $£_1$ loss function comprising an $l_1$ distance between the corresponding 2D image and the output; and
a perceptual loss, $£_p$, comprising an $l_1$ distance between features maps that the GAN generates.

* * * * *

UNITED STATES PATENT AND TRADEMARK OFFICE
CERTIFICATE OF CORRECTION

PATENT NO. : 11,836,852 B2
APPLICATION NO. : 17/124637
DATED : December 5, 2023
INVENTOR(S) : Junfeng Guan et al.

It is certified that error appears in the above-identified patent and that said Letters Patent is hereby corrected as shown below:

On the Title Page

Item (73) Assignee, please correct the address to read:
Board of Trustees of the University of Illinois, Urbana, IL (US)

Signed and Sealed this
Twentieth Day of February, 2024

Katherine Kelly Vidal
*Director of the United States Patent and Trademark Office*